United States Patent

[11] 3,546,393

[72] Inventor Amos E. Joel, Jr.
South Orange, New Jersey
[21] Appl. No. 668,530
[22] Filed Sept. 18, 1967
[45] Patented Dec. 8, 1970
[73] Assignee Bell Telephone Laboratories, Incorporated
Murray Hill, Berkeley Heights, New Jersey
a corporation of New York

[54] TELEPHONE SWITCHING SYSTEM
57 Claims, 21 Drawing Figs.

[52] U.S. Cl. 179/18
[51] Int. Cl. H04m 3/42
[50] Field of Search 179/18.01, 18.02, 18.03, 84(B), 18.19, 18(AD), 18

[56] References Cited

UNITED STATES PATENTS 3,449,527 6/1969 Strobelt 179/18(.02)

*Primary Examiner*—Ralph D. Blakeslee
*Attorneys*—R. J. Guenther and James Warren Falk

ABSTRACT: An arrangement for providing special services to telephone stations served by diverse switching centers without modification of such centers by the employment of a supervisory switching system operable to monitor control signals associated with each connection within such centers. The supervisory switching system is associated with a stored-program switching center operable to provide call processing information directly related to each connection as determined by the station involved. Under control of such information, the supervisory switching system directs the establishment of the respective connections so as to provide the specific special service feature required.

INVENTOR
A. E. JOEL JR.

BY Brendan A. Ward
ATTORNEY

TSPS CENTER 6

NEW SERVICES LINK & LINK CONTROL CCT. 22

TSPS CENTER 6

TELEPHONE SWITCHING SYSTEM

BACKGROUND OF THE INVENTION

1. Field of the Invention

This invention pertains to the provision of special service features to stations served by automatic switching systems.

2. Description of the Prior Art

The telephone, considered at one time as a substitute for face-to-face communication only in rare instances, has risen to a point today where it is an integral and necessary part of modern society. As this society continues to increase in complexity, the demand upon the telephone also increases correspondingly. Thus today, mere voice communication from one fixed location to another does not satisfy public demand. Accordingly, to meet the need for more modern communication numerous special services are being provided to render telephone service more convenient and more flexible.

Among the many special service features being provided are centralized abbreviated dialing (see W. A. Malthaner et al., U.S. Pat. No. 2,951,908, dated Sept. 6, 1960), call transfer (see S. Kandel et al. Case 2-2, application Ser. No. 421,006, filed Dec. 24, 1964, now U.S. Pat. No. 3,363,063, issued Jan. 9, 1968), call-waiting (see M. E. Krom U.S. Pat. No. 3,320,367, dated May 16, 1967), and add-on (see Krom patent, supra). Obviously, the technical requirements imposed by the provisions of these features involve extensive modification of the respective switching systems which serve the various stations. Such modification is inherently expensive. The extent of the expense is determined by the specific type of switching system involved, with extreme examples ranging as far as total replacement of the associated switching system machine.

The problem of providing special services is further compounded by the fact that a special service provided to stations served by one system must also be provided to other stations within the area, even though such other stations may be served by less flexible systems. Thus, although the random boundaries of particular central offices may offer sound technical and economic reasons for denying such service to one group of telephone stations while extending it to another group, sound public policy and economic reality dictate that such a situation may not prevail.

Accordingly, a need exists in the art for an arrangement which will permit the provision of special service features by all central offices irrespective of the specific type of office involved. A need also exists for an arrangement whereby the foregoing may be effected with minimal modification to existing equipment. Additionally, a need exists for an arrangement which will accomplish the foregoing while utilizing existing switching system facilities to the highest degree so as to render the provision of such features most economically attractive.

SUMMARY OF THE INVENTION

In the exemplary embodiment, special service features such as temporary transfer, abbreviated dialing calls-waiting and add-on are provided to stations served by electromechanical central offices without the provision of special service equipment at such offices. Instead of so equipping each electromechanical office, a supervisory switching system is provided which is associated with a plurality of electromechanical offices and a single stored program. The stored program system is preprogrammed with information relative to the special services category of each station served by the respective electromechanical offices. The supervisory system is arranged to monitor control signals associated with the establishment of connections through each such electromechanical office, and is further arranged to interrogate the stored program system to obtain call-processing information regarding each connection as determined by the type of connection and the station identity. The call-processing information is then employed to vary and, where required, to supplement the establishment of the connection in the respective electromechanical office in order to provide the special service feature involved.

In accordance with one feature of my invention, special service features are provided to subscribers served by a plurality of central offices without the addition of equipment to such central offices and without the modification of equipment within such central offices.

In accordance with another feature of my invention, a supervisory switching system is arranged to monitor calling and called connections involving stations at diverse central offices and is further arranged to vary certain such connections as determined by special service features preassigned to said stations.

In accordance with still another feature of my invention, a supervisory switching system is arranged to monitor calling and called connections involving stations at diverse central offices and is further arranged to supplement such connections as determined by special service features preassigned to said stations.

In accordance with another feature of my invention, a supervisory switching system is provided to make accessible to nonstored program switching systems the facilities of a stored program-switching system.

In accordance with another feature of my invention, a centralized supervisory switching system is arranged to monitor all connections through a plurality of conventional switching systems and is controlled by the signals generated to and from the conventional switching systems in conjunction with information stored at still another switching system for effecting the establishment of connections within said conventional switching systems.

BRIEF DESCRIPTION OF THE DRAWING

The foregoing objects, features and advantages, as well as others, of the invention will be more apparent from the following description of the drawing, in which.

It will be noted that FIGS. 6 through 20 employ a type of notation referred to as "detached-contact" in which an "X," shown intersecting a conductor, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the Sept. 1955 publication of the American Institute of Electrical Engineers Transactions, Communications and Electronics, Volume 74, pages 505—513.

The present invention is illustrated in a telephone communications system comprising a plurality of telephone central offices and a common supervisory switching office. One of the telephone central offices is designated local switching office "A" and, as will be more apparent from that which is contained hereinafter, local switching office "A" is a step-by-step type office. This particular office functions in the well-known step-by-step manner which, as is also well known, employs a direct progressive switching network to complete connections to and from stations served by the central office.

Another telephone central office is designated as local switching office "B." It is intended that local switching office "B" shall be of the crossbar common control type, for example, the type known as 05 crossbar which is disclosed in the A. J. Busch U.S. Pat. No. 2,585,904 issued Feb. 19, 1952.

Still another telephone office involved in applicant's illustrative embodiment is a stored program center (TSPS center). It is intended that this particular office shall be of the type disclosed in copending U.S. Pat. application Ser. No. 519,787 of R. J. Jaeger, Jr. and Amos E. Joel, Jr., dated Jan. 10, 1966, now U.S. Pat. No. 3,484,560, issued Dec. 16, 1969. It is to be understood, however, that the present invention is not limited to use in a telephone-switching system involving offices of only the foregoing type, but, in fact, may be utilized with numerous other known types of offices.

Figure 1:
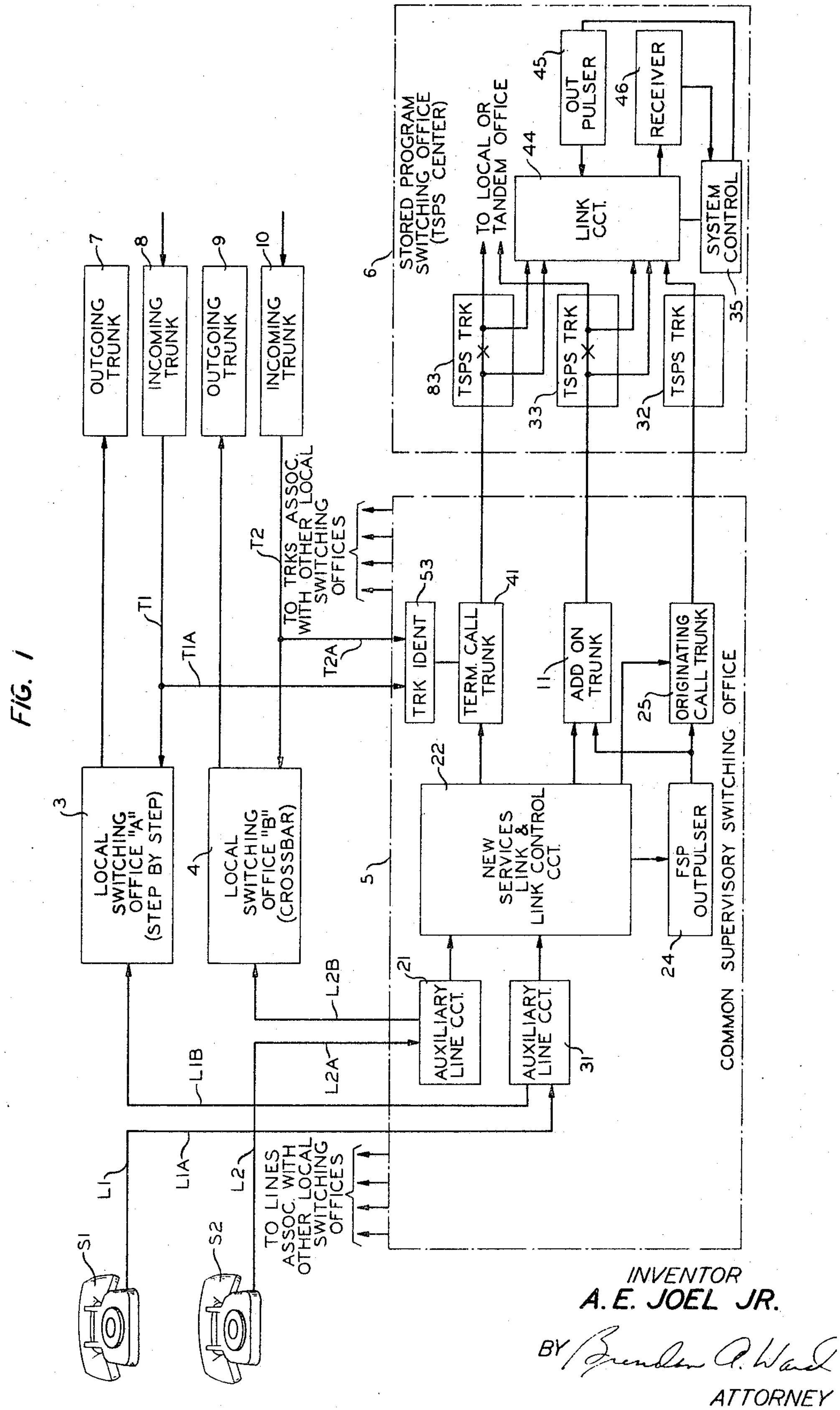
FIG. 1 is essentially a broad block diagram showing the interrelation of the exemplary embodiment of the invention.

The invention described herein is particularly concerned with apparatus in common supervisory switching office 5 which is represented by the block shown with heavy lines in FIG. 1 in order to distinguish it from prior art equipment units, which are neither shown nor described in detail except where necessary for a complete understanding of the invention.

For the purpose of illustration, it is intended that the apparatus of local switching office "A" which is designated as block 3 in FIG. 1 and the associated outgoing trunk 7 and incoming trunk 8, as well as the more specific components within local switching office "A" shown on succeeding FIGS. shall correspond to apparatus in conventional step-by-step systems as disclosed in numerous prior art publications.

It is further intended that local switching office "B" which is designated as block 4 of FIG. 1 and the associated outgoing trunk 9 and incoming trunk 10, as well as other components within block 4 shown on succeeding FIGS. shall correspond to similarly designated components disclosed in the aforesaid Busch patent.

It is also intended that the component elements of the stored program office (TSPS center), which is designated as block 6 in FIG. 1, as well as other components within block 6 shown on succeeding FIGS. shall correspond to apparatus disclosed in the aforesaid copending application of Messrs. Jaeger and Joel.

For a more complete description of the construction and operation of the aforesaid components beyond that contained hereinafter, the appropriate prior art application or publications, as set forth above, may be consulted.

GENERAL DESCRIPTION

The interrelation and function of the equipment units of the exemplary embodiment will now be described with reference to FIG. 1 wherein the interconnection of circuit blocks has been designated by arrows to show the direction of circuit action.

As will be more apparent from that which is contained hereinafter, FIG. 1 constitutes an overall block diagram of the functioning of the exemplary embodiment. The purpose of FIG. 1 is to broadly portray the manner in which common supervisory office 5 performs its function in conjunction with stored program switching office 6 in order to render a broad spectrum of special service features available to telephone stations served by diverse telephone switching offices. As will also be more apparent from the subsequent description, FIGS. 2 through 5 are block diagrams each respectively portraying the manner in which a specific special service feature is provided to a particular station served by an associated telephone office.

In the following, a general description will first be provided of the manner in which the various circuit blocks of FIG. 1 cooperate so as to provide the features herein earlier set forth.

1.1 Figure 1—Over-all Block Diagram

FIG. 1 depicts a station S1 which is associated with local switching office "A." Station S1 is, of course, but one of the many stations which are served by local switching office "A." As will be more apparent from that which is contained hereinafter, any one or all such other stations may be arranged in the manner set forth herein for station S1.

Outgoing trunk 7 and incoming trunk 8 are shown connected to local switching office "A." These trunks are employed to serve telephone traffic through local switching office "A" in a manner well known in the art.

FIG. 1 further shows that the subscriber loop L1 associated with station S1 is connected via loop L1A to auxiliary line circuit 31 in common supervisory system 5. It will further be noted that the subscriber loop then extends via L1B from auxiliary line circuit 31 back to local switching office "A."

In similar fashion to that described for station S1, station S2, which is associated with local switching office "B," is shown as being connected from subset S2 via subscriber loop L2, L2A, through auxiliary line circuit 21 in common supervisory switching office 5, and via loop L2B to local switching office "B." In similar manner to that described to outgoing trunk 7 and incoming trunk 8 of local switching office "A," outgoing trunk 9 and incoming trunk 10 in local switching office "B" provide the circuit paths necessary for traffic to and from stations served by local switching office "B."

In order to simplify the description in the following text, local switching office "A" shall be referred to as office A. Local switching office "B" shall be referred to as office B. Common supervisory switching office 5 shall be referred to as supervisory office 5. Stored program switching system (TSPS center 6) shall be referred to as TSPS center 6.

Proceeding now with the description; as well known in the art, stations such as S1 and S2 are normally connected directly via there respective subscriber loops L1 and L2 through to a line appearance in the associated central office. It will be noted that FIG. 1 depicts station S1 as being associated with auxiliary line circuit 31 in supervisory office 5 via L1 and L1A. As will be more apparent from that which is contained hereinafter, subscriber loop L1 also has continuity through to office A via loop L1B. The purpose of auxiliary line circuit 31 is to provide an appearance in supervisory office 5 to permit monitoring of the control signals generated by station S1, and also to permit supervisory office 5 to control the subscriber loop associated with station S1 as dictated by the requirements of various specific special service features. Thus, when station S1 is placed in an off-hook condition, switching office A is alerted to this face in the well-known manner. However, in the instant case, supervisory office 5 is also alerted to this fact and prepares suitable equipment within the supervisory office to monitor control signals generated by station S1. The foregoing statements with respect to station S1 apply equally as well to station S2 as will be recognized from the subsequent description.

In FIG. 1 communication path T1, which is associated with trunk conductors of incoming trunk 8 of office A, is multiplied via T1A to trunk identifier 53 in supervisory office 5. It will also be noted that trunk identifier 53 is associated with terminating call trunk 41 in supervisory office 5. As will be more apparent from that which is contained hereinafter, the immediately aforesaid component arrangement permits the identification and control of incoming trunks connected to stations served by office A so as to provide the particular special service feature, if any, to which a called station is entitled.

Summarizing at this point, it may be stated that special service features provided to telephone stations are inherently concerned with respect either to a call originating at the subscriber station or with respect to a call terminating to a subscriber station. More specifically, a feature, such as add-on, whereby a subscriber may add an additional called station to an existing telephone connection inherently involves originating a call. In similar fashion, the special service feature known as abbreviated dialing, whereby a station may generate a two or three digit code in order to cause the completion of a connection through to another station normally identified by a seven or ten digit number, is also inherently an originating call in nature. Similarly, the feature, know as call-waiting, whereby a busy called station may be alerted by an audible signal to a subsequent incoming call to that station, inherently involves a terminating call in nature. And finally, the special service feature, known as temporary transfer, wherein a call directed to a station is automatically forwarded from that station through to another remote station, also inherently involves a terminating connection.

From the foregoing description, it will be noted that the auxiliary line circuits in supervisory office 5, each of which is exclusively associated with a particular telephone station, provide automatic access to supervisory office 5 to permit recognition of circuit actions involving originating connections from the associated station thus facilitating the provision of originating call special services as required. In similar fashion, the multiplying of the communications paths associated with the incoming trunks, such as incoming trunk 8, through a trunk identifier to a terminating call trunk, such as terminating call trunk 41, provides access to supervisory office 5 to facilitate the provision of means for providing those special service features associated with terminating calls to privileged stations.

Although the exemplary embodiment discloses only incoming trunks in the respective offices, it is to be noted that the subsequent description applies equally as well to intraoffice trunks since, with respect to a called station, connections involving incoming trunks and connections involving intraoffice trunks are substantially identical.

Supervisory office 5 is provided with a new services link and link control circuit 22. As will be more apparent from that which is contained hereinafter, the function of the link and link control circuit is to associate a particular auxiliary line circuit with an available terminating call trunk, originating call trunk, or add-on trunk as determined by the type of call and special service feature involved. The link circuit thus provides network concentration of a large number of auxiliary line circuits to a relatively few trunk circuits of varying type and function.

As will be more apparent from the subsequent description, each of the trunks terminated on the output side of new services link and link control circuit 22 perform specified functions dependent on the type of connection involved and the special service feature which is to be implemented. Thus, terminating call trunk 41 illustrates one type of trunk which is provided and which is associated with an auxiliary line circuit for each call which terminates to a special service line. Originating call trunk 25 illustrates another type of trunk which is provided and which is associated with an auxiliary line circuit for each call originating from an off-hook condition of an associated subscriber station. Add-on trunk 11 illustrates still another type of trunk which is connected via new services link and link control circuit 22 to an auxiliary line circuit in response to an enabling signal from a station, presently involved in a connection, which desires to add an additional party to such connection.

Each of the aforesaid trunks are connected via permanent cable conductors to a TSPS trunk in TSPS center 6. As will be more apparent from the following, each TSPS trunk is enabled in response to a loop closure by its counterpart trunk in supervisory office 5. The enabling of the TSPS trunk, in turn, activates TSPS center 6 to perform its function in connection with the processing of the associated call.

TSPS center 6, as shown in FIG. 1, constitutes an electronic stored program-switching system of the general type disclosed in the earlier cited copending application of R. J. Jaeger and A. E. Joel, Jr. The Jaeger et al. application discloses an electronic type office which is controlled in its operation by a real-time stored program processor. The Jaeger et al. system is, in turn based upon the more fundamental electronic system disclosed in the copending application of A. H. Doblmaier et al., Ser. No. 334,875, filed Dec. 31, 1963. The Doblmaier et al. system is also disclosed in detail in the entirety of the Sept. 1964 issue of the Bell System Technical Journal.

The system control circuit 35 in TSPS center 6 is what may be considered as the "brain," or the basic controlling mechanism, for the entire system. It is referred to as the stored program control (SPC) and comprises a stored program real-time machine having a processor portion and a memory portion. The processor performs arithmetical and logical operations on the data it receives from the memory portion as well as on the data it receives from external circuits, such as for example, from the scanners (See FIG. 10). The memory portion comprises bulk memory which is supplied in sufficient quantity to store all the temporary and semipermanent information and data associated with all stations served by the instant system. As described in Doblmaier et al., the SPC, in performing its functions, receives signals from the memory and from the scanners, performs the necessary arithmetical and logical operations in response to the received signals, and generates output commands which are transmitted to other circuits of the system to control them in the performance of their required call functions. The specific manner in which this is accomplished for the instant invention will be described in more detail in the succeeding sections. For purposes of a general understanding of the embodiment at this point, it is sufficient to note that TSPS center 6, when so programmed, is capable of providing call-processing information and instructions for all stations served by supervisory office 5.

Figure 2:
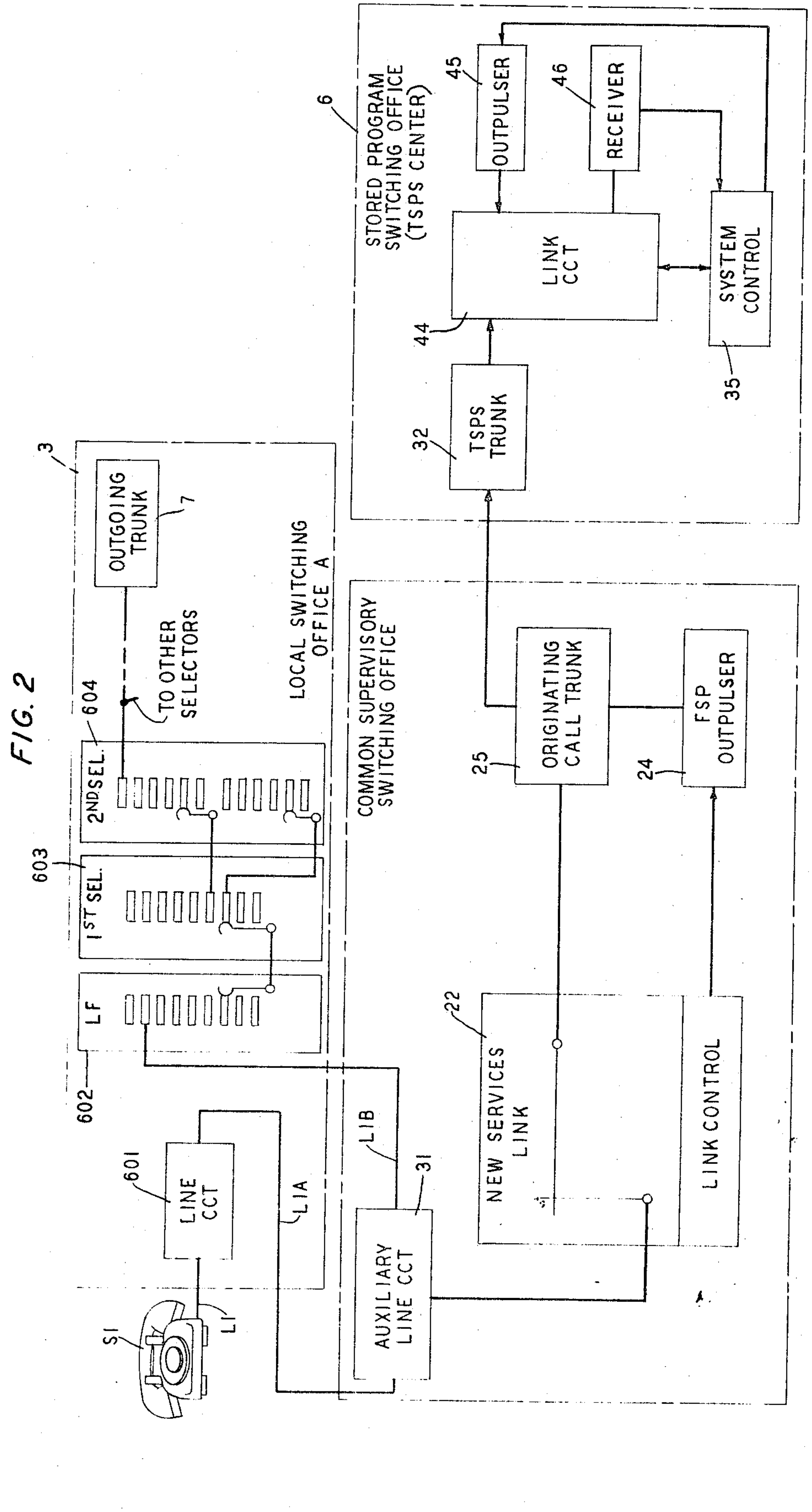
FIGS. 2 through 5 are more specific block diagrams, each respectively directed to particular aspects of the exemplary embodiment of the invention as will be more apparent from that which is contained hereinafter.

1.2 Figure 2—Abbreviated Dialing Feature

This section will describe broadly the manner in which the abbreviated dialing feature is provided to station S1. Unless otherwise indicated all reference in this section are to FIG. 2.

Upon an off-hook condition of station S1 (typical), the line circuit in switching office A is alerted to the fact that a calling connection is about to commence. Auxiliary line circuit 31 in supervisory office 5 also detects the off-hook condition of station S1, and supervisory office 5 thereupon prepares to monitor information subsequently generated from the station.

On each such call originated, a connection is automatically completed within supervisory office 5 from auxiliary line circuit 31 through the new services link and link control circuit 22 to an available originating call trunk such as trunk 25. Each originating call trunk is connected by conventional trunk conductors to a two-way trunk, such as TSPS trunk 32 in TSP center 6. As will be apparent from the subsequent description, the connection of the S1 station loop L1 through auxiliary line circuit 31, link and link control circuit 22, originating call trunk 25 through to trunk circuit 32 in TSPS center 6 takes place within the period of time prior to the commencement of dialing from the originating station S1. Upon the enabling of trunk 32 in TSPS center 6, a connection is completed through link circuit 44 to an appropriate receiver such as receiver 46.

From the foregoing, it will be noted that control signals generated from station S1 will simultaneously be detected at two separate terminal points. The signals are transmitted to switching office A for detection in the conventional manner and also through supervisory office 5 for detection in TSPS center 6.

As will be more apparent from the subsequent description, system control circuit 35 in TSPS center 6 comprises control circuitry for establishing connections through link circuit 44 and also comprises memory equipment for providing a source of information with respect to calling connections. In the instant invention, system control circuit 35 is programmed with special service information individually related to all stations served by supervisory office 5. In order to utilize this information, it is but necessary to provide system control circuit 35 with the identity of the station with which it is presently concerned and the type of call involved.

In the illustrative embodiment, each auxiliary line circuit has a unique appearance associated therewith in new services link circuit 22. Each such appearance is identified by an arbitrary three digit number which is automatically recorded in an outpulser, such as outpulser 24 in supervisory office 5 upon the completion of a connection between an auxiliary line circuit appearance and an originating or add-on trunk appearance via link circuit 22. Receiver 46 in TSPS center 6 is arranged to simultaneously receive and register two distinct types of signalling. Thus, during the interval that dial pulses (typical) are being forwarded from station S1 through to receiver 46 as earlier described, outpulser 24 is arranged to concurrently generate frequency shift pulses over the same trunk conductors for registration of the station identity in receiver 46.

Thus, upon completion of dialing, system control circuit 35 has available to it the control digits dialed by station S1 and also the identity of station S1. Accordingly, system control circuit 35 interrogates its memory so as to ascertain the significance of the control signals in light of the specific station identity.

As earlier noted, the illustrative embodiment is concerned principally with two particular special services associated with originating calls; namely, abbreviated dialing and add-on. Assuming, for purpose of illustration, that an abbreviated dialing call is involved, station S1 will have transmitted an abbreviated code comprising, for example, two digits. System control circuit 35 recognizes from the station identity that the calling station is entitled to abbreviated dialing service. Accordingly, receiver 46 in TSPS center 6 is released from the connection to TSPS trunk 32, and outpulser 45 is connected thereto. Outpulser 45 is primed by system control circuit 35 with the full directory number of the called station based upon the directory number stored in memory corresponding to the code dialed by station S1. A signal is forwarded from outpulser 45 in TSPS center 6 through link control circuit 22 to auxiliary line circuit 31 in supervisory office 5 so as to cause the release of the priorly established linkage connection in switching office A. A new originating call start signal is then generated by auxiliary line circuit 31. The directory number read from the memory in TSPS center 6 is thereupon transmitted by outpulser 45 through link circuit 44 and via trunk 32 in TSPS center 6 over the trunk conductors through originating call trunk 25, link circuit 22, auxiliary line circuit 31, conductor loop L1B to switching office A. The transmitted directory number thereupon controls the switching network of office A to complete a calling connection in the well-known manner. Supervisory switching office 5 and TSPS center 6 thereupon release from the connection.

Figure 3:
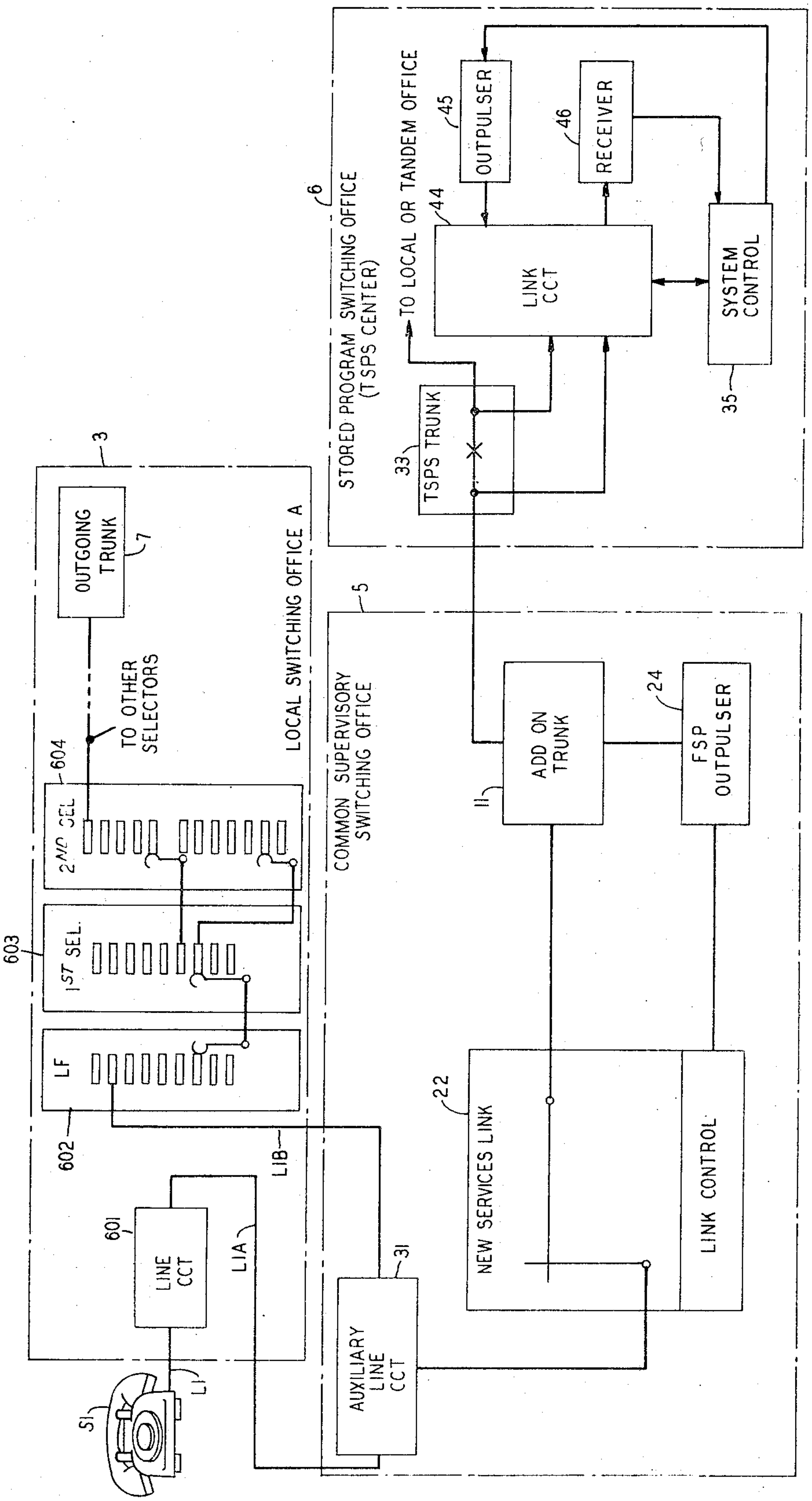

1.3 Figure 3—Add-on Feature

This section will broadly describe the manner in which the add-on feature is provided to station S1 which is associated with local office A. In the following all references are to FIG. 3 unless otherwise indicated.

We shall assume that an initial connection has been established from station S1 as set forth in the preceding section, and that the add-on feature is subsequently exercised. Such exercise is preceded by an appropriate alerting signal (such as a switchhook flash) from station S1 in the well-known manner. Upon receipt of this alerting signal, auxiliary line circuit 31 signals new service link and link control circuit 22 to establish a connection through to an add-on trunk such as add-on trunk 11. Add-on trunk 11 is permanently connected via conventional cable conductors to TSPS trunk 33 in TSPS center 6. The enabling of TSPS trunk 33 of itself provides an indication that system control circuit 35 is to be concerned with an add-on call since trunk 33 handles only this type of traffic from supervisory office 5. As on the aforedescribed abbreviated dialing call, system control circuit 35 connects a receiver such as receiver 46 via link circuit 44 to TSPS trunk 33 to receive the information dialed by the calling station and also the station identity transmitted by FSP outpulser 24. Upon registration of the called line number and the identity of the calling station, system control circuit 35 causes the completion of a connection through link circuit 44 to an appropriate outpulser such as outpulser 45. The called line number is thereupon outpulsed via TSPS trunk 33 to the called destination through an associated local or tandem office (not shown). Upon answer at the called station, the calling station may, by switchhook flash, cause the initial connection and the connection to the added station to be multiplied at their junction in auxiliary line circuit 31 in conference fashion.

Upon the completion of outpulsing, outpulser 45 in TSPS center 6 is released. In similar fashion the control circuitry in supervisory office 5 also releases thus allowing the connection to remain continuous from station S1 through auxiliary line circuit 31 via switching office A to the initially called station and also from auxiliary line circuit 31 through supervisory office 5 and TSPS center 6 to the additional called station. It will be noted with respect to the foregoing that the subject originating call features of abbreviated dialing and add-on are provided to station S1 without modification of the internal structure of switching office A.

Figure 4:
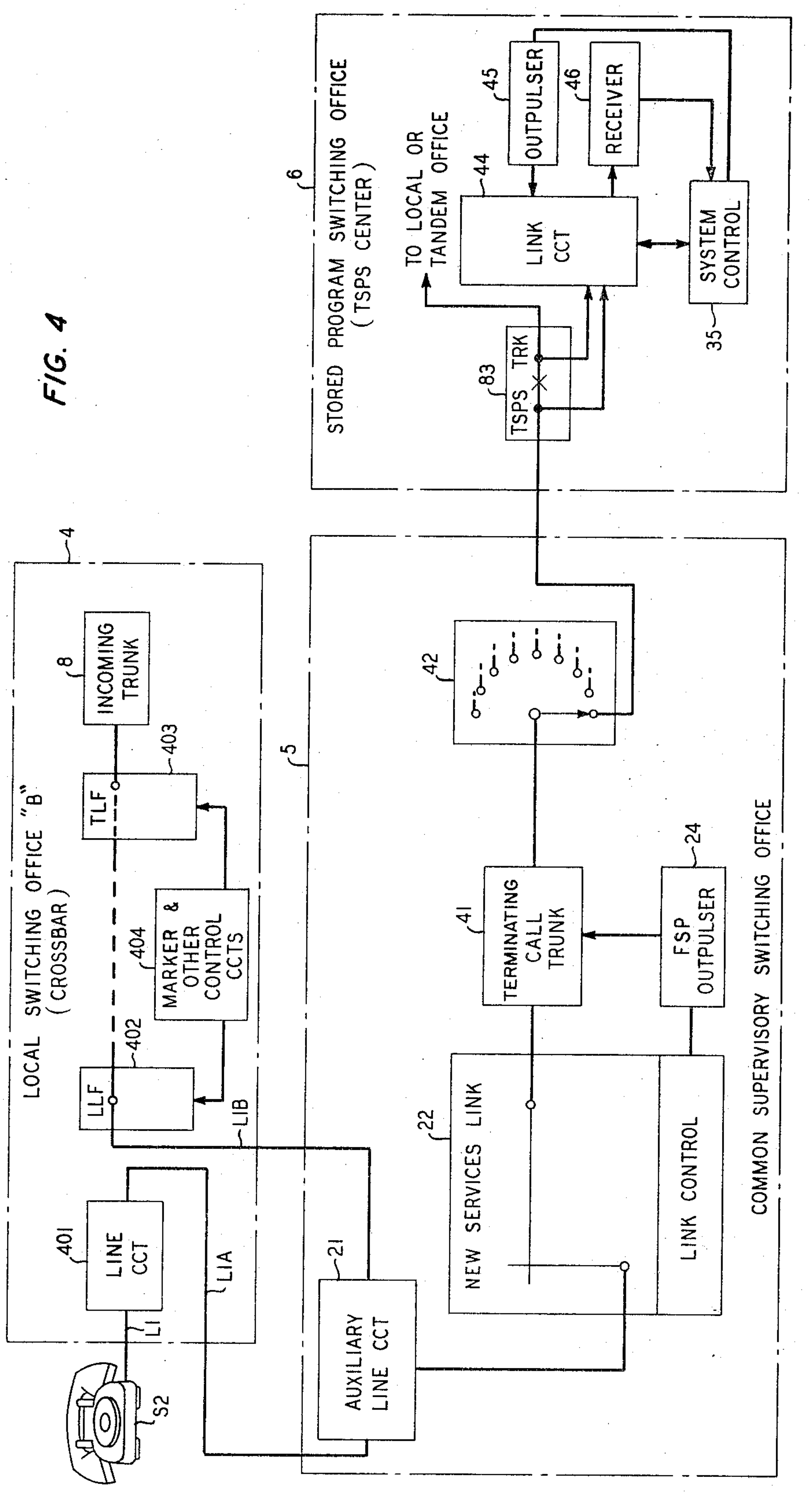

1.4 Figure 4—Call Transfer Feature

This section will broadly describe the manner in which the call transfer feature is provided to station S2 which is associated with local switching office B. All references are to FIG. 4 unless otherwise indicated.

With respect to the provision of special service features on terminating calls to privileged stations such as station S2, incoming calls are completed via the appropriate incoming trunk, such as incoming trunk 8, through switching office B to the called station in the normal prior art manner. In the instant illustrative embodiment, as earlier noted, we are concerned with two special services associated with terminating calls; namely, temporary transfer and calls-waiting.

Assuming that station S2 is exercising the call transfer feature, an appropriate transfer directory number will have been priorly recorded in the memory in TSPS center 6. Accordingly, when an incoming call is directed to station S2, a called connection is completed thereto and ringing commences at the called station. The ringing condition is also detected by auxiliary line circuit 21 in supervisory office 5. Auxiliary line circuit 21 thereupon generates a start signal resulting in a connection being automatically completed through new services link and link control circuit 22 to a terminating call trunk, such as terminating call trunk 41. Terminating call trunk 41 is connected via the off-normal terminal of selector switch 42 to TSPS trunk 83 in TSPS center 6. (The function of selector switch 42 will be discussed subsequently.) TSPS trunk 83 is thereupon enabled in response to the enabling of terminating call trunk 41. Upon the enabling of TSPS trunk 83, system control circuit 35 connects a receiver, such as receiver 46, to register the aforesaid identity of station S1 which is transmitted over the trunk conductors to receiver 46 from FSP outpulser 24 as earlier set forth.

Upon receipt of the identity of station S2 in receiver 46, system control circuit 35 interrogates its memory. Upon recognizing the activated temporary transfer status of station S2, system control circuit 35 causes the release of receiver 46 and the completion of a connection from outpulser 45 via link circuit 44 to TSPS trunk 83. The transfer directory number is forwarded via the associated local or tandem office (not shown) to the transfer location. Upon completing this function, the associated common control equipment in supervisory switching system 5 and in TSPS center 6 are released. The temporary transfer connection thus extends from incoming trunk 8 through switching office B and via auxiliary line circuit 21 in supervisory office 5 through new services link and link control circuit 22, terminating call trunk 41 to TSPS center 6 and via TSPS trunk 83 to the transfer location. Upon answer at the transfer location, conversation may ensue in the well-known manner.

Figure 5:
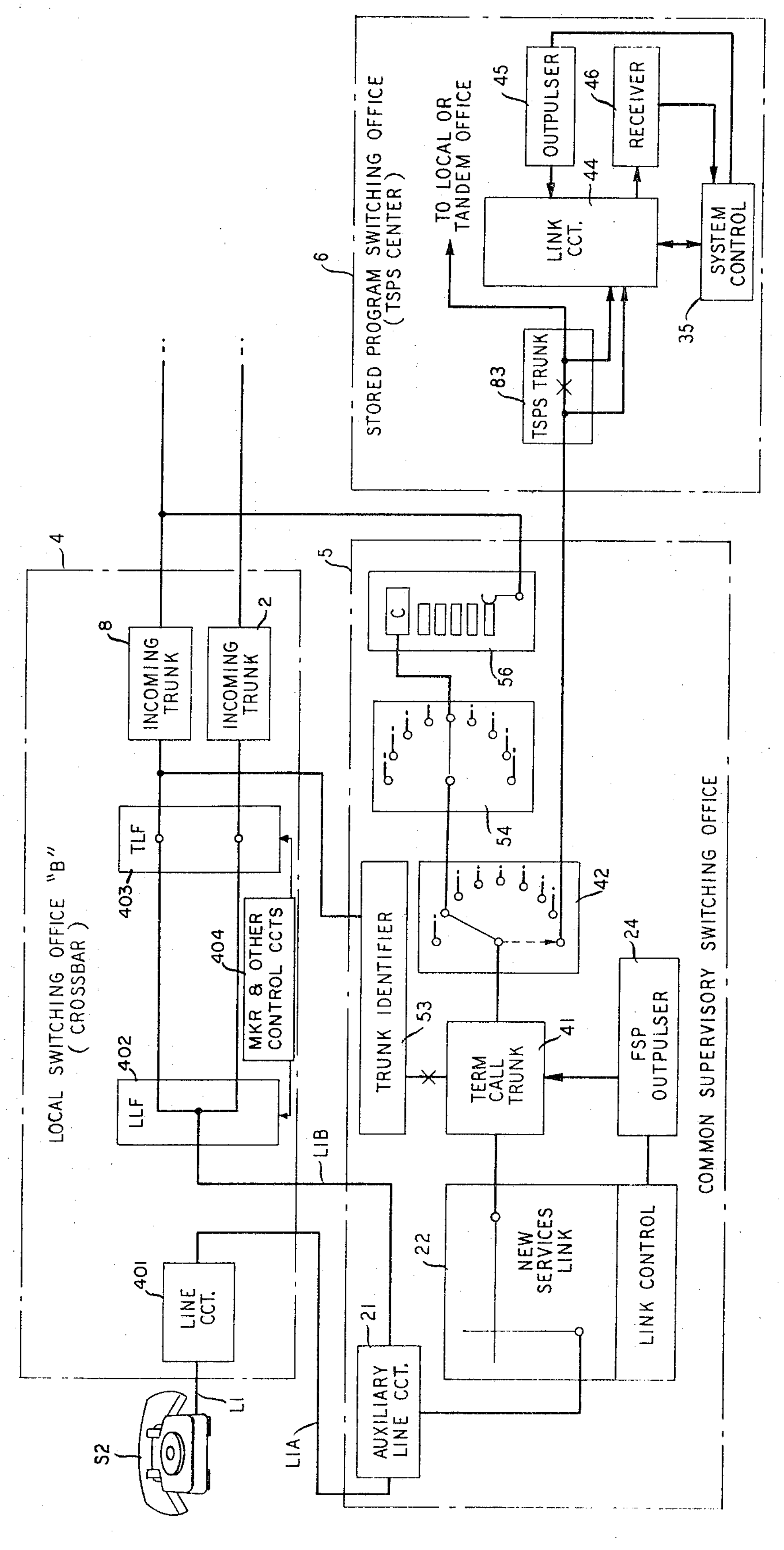

1.5 Figure 5—Call-Waiting Feature

This section will broadly describe the manner in which the call-waiting feature is provided to station S2 which is associated with local switching office B. All references are to FIG. 5 unless otherwise indicated.

We shall assume that station S2 is provided only with the call-waiting feature, and also that station S2 is initially in an idle condition. We shall now further assume that a terminating connection is directed to station S2 by another calling station (not shown). A linkage connection is completed in the conventional manner through local office B to called station S2.

As earlier set forth for the temporary transfer feature, auxiliary line circuit 21 detects the called condition of station S2 and a connection is completed from auxiliary line circuit 21, via a terminating call trunk such as terminating call trunk 41 and via TSPS trunk 83 through to TSPS center 6. As also set forth for the temporary transfer feature, receiver 46 is connected through link circuit 44 in TSPS center 6 to TSPS trunk 83.

TSPS center 6 employs the arbitrary three digit number assigned to auxiliary line circuit 21 which is transmitted by outpulser 24 as earlier described to ascertain the special service status of station S2 (i.e., temporary transfer activation as in the foregoing section). We shall now assume that the subscriber at station S2 places the subset in an off-hook condition in answering the call. Upon answer of the calling connection by station S2, a release signal is forwarded to TSPS center 6. Terminating call trunk 41 thereupon enables trunk identifier 53 to commence identification of the trunk associated with the incoming call. During this interval, conversation may take place between the calling and called station in the usual fashion over the initially established linkage connection through local office B.

Upon identification of the trunk associated with the incoming call, identifier 53 pulses the trunk number through terminating call trunk 41 to an abbreviated switch train comprising selectors 42 and 54, and connector 56. Thus, an independent linkage connection is established from the input conductors of incoming trunk 8 to supervisory office 5 and via connector 56, selectors 54 and 42, terminating call trunk 41, through new services link circuit 22, to auxiliary line circuit 21 and thus to station S2. The initial terminating connection to station S2 through local office B is thereupon released by shunting the supervisory relay in incoming trunk 8.

From the foregoing it will be recognized that the terminating connection through to station S2 is now continuous only through supervisory office 5, and the line appearance of station S2 in local office B is available for association with a new incoming call to station S2.

Accordingly, upon the occurrence of a subsequent incoming call to station S2, a linkage connection is completed through to auxiliary line circuit 21 as earlier described. Terminating call trunk 41 is signalled and thereupon transmits an alerting signal (audible tone) to station S2 to indicate the subsequent incoming connection. Flashing of the switchhook at station S2 permits the called party to switch back and forth between the two connections, one to the initial calling party over the abbreviated switch train through supervisory office 5, and the other to the subsequent calling party through the local office B switch train.

With respect to the aforedescribed provision of special services on terminating calls, it will be noted that the services are provided without modification of the internal structure of the associated local office B. In the description of the illustrative embodiment to follow herein, the manner in which such services are provided, irrespective of the type of local central office, will be set forth in more detail.

DETAILED DESCRIPTION

This section will provide a detailed description of the exemplary embodiment of my invention. It is believed that a clear understanding of the invention will be facilitated by initially describing specified components of the embodiment prior to describing in detail the manner in which such components cooperate to provide each of the aforesaid special service features for various stations at diverse central offices.

2.01 Link and Link Control Circuit 22

It is intended that link and link control circuit 22 of the instant embodiment shall be substantially similar, except as hereinafter noted, to the link and link control arrangement disclosed in U.S. Pat. No. 3,159,716 issued to G. Riddell and C. A. Throckmorton on Dec. 1, 1964.

In the following a description of this link and link control circuit 22 shall be provided. It is understood, however, that where a more detailed discussion is desired, the aforesaid Riddell et al. patent may be consulted.

Figure 11:
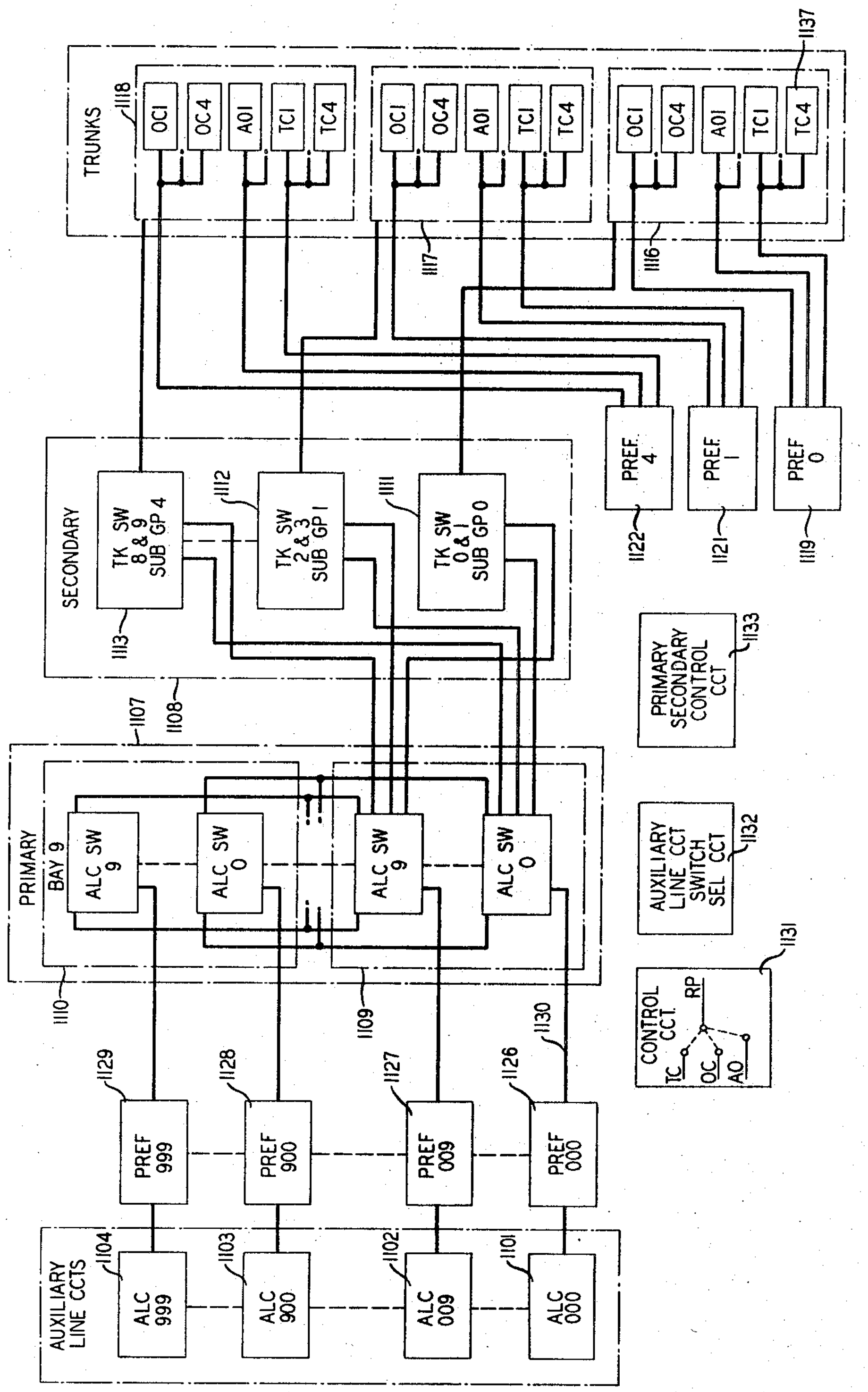

Referring now to FIG. 11, there is shown in schematic form an arrangement whereby anyone of a plurality of auxiliary line circuits (ALC) may be selectively connected to anyone of a plurality of trunks (OC-, AO-, or TC-). In the illustrative embodiment of the invention, the link circuit is arranged to handle traffic for 1,000 stations, each represented of course by an auxiliary line circuit, and to interconnect each of these auxiliary line circuits, as they are involved on a call with anyone of 50 trunks. The 1,000 auxiliary line circuits are preferable arranged in groups of 10, and the 50 trunks are preferably arranged in five subgroups of ten each. In order to simplify the description so far as possible consistent with full and complete disclosure of the invention, only representative elements are shown, the intervention of other similar elements being indicated by dotted lines. For example, with regard to the 1,000 auxiliary line circuits, only four are shown, two of the first group ALC–000, box 1101, and ALC–009, box 1102, representing the 10 auxiliary line circuits of that group, and two of the last group, ALC–900, box 1103, and ALC–999, box 1104, representing the 10 auxiliary line circuits of that group.

The switches of the link are of the crossbar type and are divided into two general groups, the primary or auxiliary line circuit switches, box 1107, and the secondary or trunk switches, box 1108. The primary switches are preferably arranged in 10 bays, each bay being equipped with ten crossbar switches, each with a capacity of 10 auxiliary line circuits. Two bays, bay O, box 1109, and bay 9, box 1110, are shown in the drawing. The secondary, or trunk, switches are preferably arranged in five subgroups, each subgroup comprising in effect two switches. Three of the five subgroups are shown in the drawing, subgroup O, box 1111, which includes trunk switches O and 1, subgroup 1, box 1112, which includes trunk switches 2 and 3, and subgroup 4, box 1113, which includes trunk switches 8 and 9.

As pointed out above, the trunks are preferably arranged in five subgroups of 10 trunks each for a total of 50. Three of these subgroups are shown in the drawing as boxes 1116, 1117 and 1118. The trunks of each subgroup are further divided into three classes or groups as to type, one group comprising terminating call trunks (TC-), another group comprising originating call trunks (OC-), and the remaining group comprising add-on trunks (AO-).

In the embodiment, for simplicity of disclosure, it is assumed that all stations employ rotary dials only. As described in the cited Riddell et al. application, the stations may, in fact, also comprise TOUCH-TONE subsets, since the link is capable of serving both rotary dial and TOUCH-TONE customers.

Obviously, the specific number of trunks in each class or group will be determined in accordance with the various special service features provided and the relative usage of these features by the stations involved. For purpose of illustration, it will be assumed that each subgroup of 10 trunks comprises four terminating call trunks, four originating call trunks, and two add-on trunks. Representative trunks of each type are shown in FIG. 11, for example, in trunk subgroup 1116, the first and fourth originating call trunk (OC1, OC4), the first add-on trunk (AO1), and the first and fourth terminating call trunk (TC1, TC4) are shown.

A preference circuit is associated with each trunk subgroup; three of these circuits are shown, preference circuit O, box 1119, associated with trunk subgroup 1116, preference circuit 1, box 1121, associated with trunk subgroup 1117, and preference circuit 4, box 1122, associated with trunk subgroup 1118.

A preference circuit is associated with each auxiliary line circuit. Four of these circuits are shown in the drawing, preference circuit 000, box 1126, associated with auxiliary line circuit 1101, preference circuit 009, box 1127, associated with auxiliary line circuit 1102, preference circuit 900, box

1128, associated with auxiliary line circuit 1103, and preference circuit 999, box 1129, associated with auxiliary line circuit 1104.

In order to further describe the link arrangement with reference to FIG. 11, let it be assumed that the auxiliary line circuit 000 of box 1101 is seized for a call. As will be described more fully hereinafter, ground is applied to the sleeve of the auxiliary line circuit in the usual manner and causes the preference relay of preference circuit 1126 to operate. Auxiliary line circuit 1101 and preference circuit 1126 are connected over lead 1130 to the associated auxiliary line circuit switch of the primary group. Operation of the preference relay associated with the auxiliary line circuit causes, in turn, operation of the associated horizontal group relay of auxiliary line circuit switch selecting circuit 1132. The primary or ALC switches are arranged on a horizontal group basis and each group of switches is associated with a horizontal group selected (HGS) relay (not shown) of auxiliary line circuit switch selecting circuit 1132. The horizontal group selected relay, when operated, disconnects operating battery from all horizontal group relays and associated relays of the particular group thereby permitting recognition and selection of only one primary switch within the horizontal group of switches.

When the preference relay in preference circuit 1126 operates as above described, battery is extended to the associated trunk preference terminal (RP) of the control circuit 1131. This terminal may be connected by local wiring to a TC (terminating call), OC (originating call), or AO (add-on) terminal depending upon the types of call presently being served by the auxiliary line circuit as discussed more fully hereinafter.

The horizontal groups of primary or ALC switches are arranged in pairs with each pair having a different trunk subgroup as first choice. Thus, trunk subgroup O, box 1116, is first preference for horizontal switch groups O and 1, trunk subgroup 1, box 1117, is first preference for horizontal switch groups 2 and 3, and so on. Since the busy or idle condition of the trunk subgroup is not known when start battery is connected to the RP terminal as above described, control circuit 1131 is arranged to consider all subgroups and to select that one which is most preferred at the moment. That is, battery is applied to all five start relays (not shown) of control circuit 1131, these respective start relays represent both the horizontal group of ALC switches and the five trunk subgroups. For a trunk subgroup to be selected the following conditions must be met:

1. No other horizontal ALC switch group is in the process of setting up a connection to the trunk subgroup in question;
2. The trunk subgroup must contain an idle trunk of the type required for the call; and
3. There must be available an idle link between the horizontal ALC switch group and the trunk subgroup.

In the present instance, therefore, the maximum number of start relays attempting to operate will be five; however, only that relay associated with the most preferred trunk will operate and lock.

The particular start relay now operated, and locked in that position, indicates both the horizontal ALC switch group and the trunk subgroup to be connected or linked.

In the subject link arrangement, each of the horizontal groups of primary or ALC switches has access to all five subgroups of trunks. It follows from this that five different calls originating in five different horizontal ALC switch groups can be simultaneously served provided there are available idle links to a corresponding number of trunk subgroups having an idle trunk at the time. It is also obvious that the subject link arrangement may be expanded, or replaced with a different type link, to meet a greater traffic requirement without departing from the spirit and scope of my invention.

An idle trunk in the selected subgroup is indicated by operation of the preference relay (not shown) in the associated preference circuit. Assuming that, in the present instance, trunk subgroup 1116 had been selected, then preference circuit O, box 1119, would be controlling. Thus, depending upon the type of call being processed as earlier set forth, one of the trunks OC1 to OC4, AO1 to AO2, or TC1 to TC4 of the subgroup would be identified.

When the trunk preference relay of preference circuit 1119 operates as above described, a circuit is completed thereby for operating, the select magnets of the secondary, or trunk, switch 1108, which are associated with the selected trunk, which we will assume to be TC4, box 1137.

Within the link, duplicate paths are provided from each horizontal group of ALC switches to each trunk subgroup; thus providing a highly efficient and flexible connecting system. At this point, therefore, the primary-secondary control circuit 1133 operates to determine whether both paths of the present connection are idle and, if it be so indicated, then one of the paths is selected on a "permanently preferred" basis. If only one of the paths is idle at the moment that path is seized.

After a path has been selected or when it has been determined that only one of the paths is available, battery is supplied over the path to operate a primary switch select magnet on the primary or ALC switch being served. Off-normal contacts of the operated primary switch select magnet close a circuit for operating the corresponding primary switch hold magnets. Crosspoint closure on the crossbar switch resulting from closure of the ALC switch hold magnets completes a circuit for operating the secondary or trunk switch hold magnets.

With all involved crosspoints of the primary and secondary switches now closed, a path is completed from auxiliary line circuit 000, box 1101, through the primary and secondary switches 1107 and 1108 and associated control circuits to terminating call trunk TC4, box 1137.

2.02 TSPS Center 6

As stated hereinbefore, it is intended for purpose of the illustrative embodiment that TSPS center 6 shall constitute an electronic stored program system of the type disclosed in the earlier cited Jaeger et al. and Doblmaier applications. As will be more apparent from the following, the instant invention is not dependent upon such a system, but could, in fact, employ any one of a number of systems of similar capacity and flexibility.

In the description which is to follow, the interrelation and operation of the components of TSPS center 6 will be set forth in sufficient detail to provide a clear understanding of my invention. It is understood, however, that where still greater detail is desired, the aforesaid applications may be consulted.

Referring now to FIG. 1, TSPS center 6 includes a plurality of TSPS trunk circuits which are typified by TSPS trunks 32, 33, and 83. Each of the aforesaid TSPS trunks are associated by permanent cable conductors with originating call trunk 25, add-on trunk 11, and terminating call trunk 41, respectively, in supervisory office 5. Each of the TSPS trunks is associated on their output side with link circuit 44 in TSPS center 6. TSPS trunks 33 and 83 are also associated, on their output side, with a remote local or tandem central office (not shown). Thus, via link circuit 44, each TSPS trunk circuit has means by which it may be connected to different circuits internal to TSPS center 6, such as for example, service and tone circuits (not shown), digit receivers, and outpulsers (see FIGS. 9 and 10). As described more fully hereinafter, each call served by a TSPS trunk circuit requires a plurality of connections to be established sequentially between the trunk circuit and various circuits internal to TSPS center 6. These connections permit a plurality of call functions to be performed, the specific nature of which varies in accordance with the type of call. Included among these functions are receiving call information outpulsed from supervisory office 5, transmitting call information to supervisory office 5, and transmitting information forward to a local or tandem office. In the latter instance once the outpulsing is completed, the calling and called stations remain connected speechwise via the TSPS trunk circuit. Each calling and called connection may be timed as required by TSPS center 6 and the charge data therefor automatically recorded upon its termination.

An incoming call arrives at TSPS center 6 when a trunk circuit in supervisory office 5, in response to its selection and seizure, transmits a loop closure signal forward to the TSPS trunk circuit to which it is permanently connected. This seizure signal activates control circuitry within the TSPS center which, in turn, effects the establishment of a connection between the calling TSPS trunk circuit and a DP or MF receiver, depending upon the mode of outpulsing utilized by the originating office. In order to simplify the description, it is assumed herein that only dial pulse transmission of called directory numbers are involved from supervisory office 5.

Upon transmission of the required information from supervisory office 5, control circuit 35 analyzes the information available to it regarding the call, including the information outpulsed from the originating office, and determines the circuit action required for call completion.

TSPS center 6 is not a "switching system" in the strict conventional sense since it performs no call-switching or route-establishing operations. Each through TSPS trunk circuit (such as TSPS trunks 33 and 83) are permanently connected on its incoming side to a local office outgoing trunk circuit and on its outgoing side is permanently connected to a local or tandem office incoming trunk as earlier noted. Thus, the local or tandem office incoming trunk circuit that is to serve a particular call is effectively selected at the time supervisory office 5 (or any other associated supervisory office) seizes its corresponding outgoing trunk circuits, since the seized trunk circuit is permanently connected via the TSPS trunk circuit to a local office line circuit or a tandem office incoming trunk circuit (not shown). A switching network is provided in TSPS center 6, not for call switching or routing purposes but rather for connecting a calling TSPS trunk circuit to other TSPS circuits in order that the call service it requires may be furnished. The class of each TSPS trunk is recorded in the SPC memory, thus enabling the TSPS office program to interpret properly the information received over the trunks from the supervisory office.

For example, the arbitrary three digit number which identifies the station being serves is transmitted by supervisory office 5, as earlier set forth, and is stored within system control circuit 35, where it is subsequently used for various purposes, including controlling the system operation in furnishing the class of service required on the call. In addition, if charge data recording operation is required at the TSPS center, a translation of the three digit number to the corresponding directory number is provided in the memory for use in the charge data recording operation in order that information signifying the call type may be recorded for subsequent billing purposes.

Figure 9:
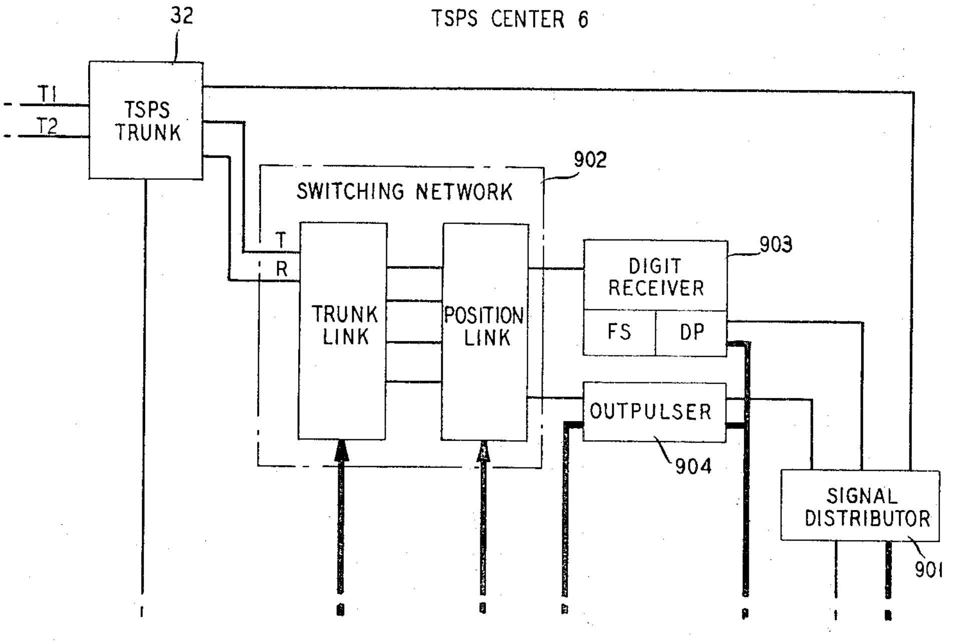
Figure 10:
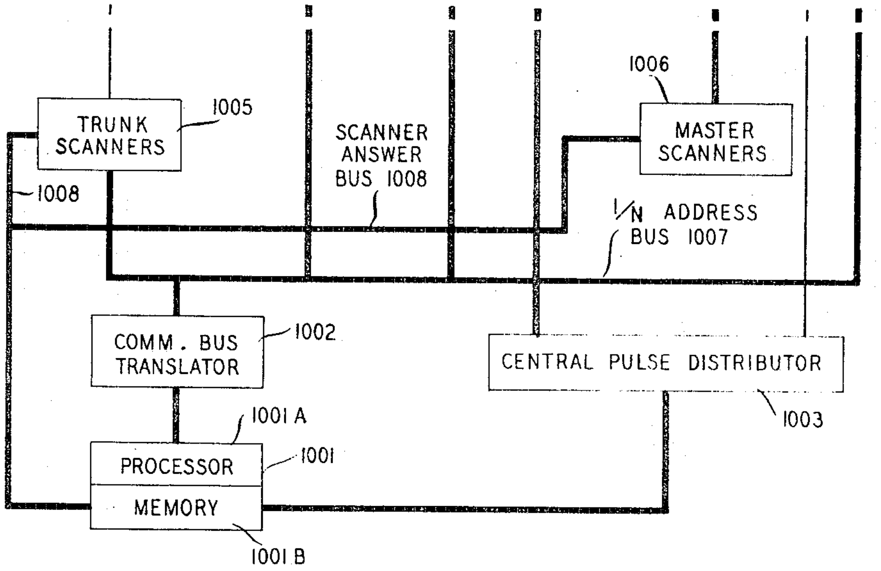

Referring now to FIGS. 9 and 10, system control circuit 35 is not shown as such in these FIGS. since it represents many circuits which together cooperate to control the operation of TSPS center 6. These circuits include stored program controls 1001, hereinafter referred to as "SPC," communications bus translator (CBT) 1002, central pulse distributors (CPD) 1003, signal distributors 901, trunk scanners 1005, and master scanners 1006.

As earlier noted herein, the SPC may be considered as the "brain," or basic controlling mechanism, for TSPS center 6. The circuits which respond to the SPC output commands are referred to as "peripheral circuits" since they are peripheral, or external to the SPC. The SPC communicates with the peripheral circuits by means of communication paths referred to in this specification as "buses." For purpose of the instant embodiment, on FIG. 10 the bus which transmits the SPC commands to the various peripheral circuits is the 1-out-of-N address bus 1007. The SPC output commands are transmitted in binary form directly to the CBT. The CBT, in turn, translates the SPC binary output into a plurality of 1-out-of-N information bits and applies these to the 1-out-of-N bus system. Thus, for each binary command received by the CBT, a 1-out-of-N-type command is applied to the 1-out-of-N address bus system and, in turn, to the peripheral circuits it serves.

Each command transmitted from the SPC via the CBT to the address bus system functionally represents or indicates a task that is to be performed by a peripheral circuit. Each address bus system comprises a plurality of wires, most of which are connected to a plurality of peripheral circuits in common. Thus a command applied by the CBT to a combination of address bus conductors is transmitted to all peripheral circuits to which the combination of conductors is connected. In the normal course of events, only one peripheral circuit responds to a command, even though many peripheral circuits receive it.

The input circuitry of each peripheral circuit is arranged so that it does not respond to an address bus command unless it has first been primed or unlocked by the reception of a signal hereafter termed an "enable pulse." Central pulse distributor 1003 operates under control of the SPC and is the circuit which transmits the enable pulses to the various peripheral circuits. These enable pulses are transmitted over dedicated conductor pairs unique to each peripheral circuit. The transmission of an enable pulse from the CPD to a peripheral circuit unlocks the receiving portion of the peripheral circuit and enables it to respond to the command currently on the address bus to which the peripheral circuit is connected. In this manner, the SPC effects the operation of a selected peripheral circuit by causing the CBT to gate onto the address bus system the command specifying the desired operation of the selected peripheral circuit and, at the same time, by causing the CPD to transmit an enable pulse over a dedicated conductor pair to the selected peripheral circuit. The peripheral circuits that operate in the manner are the switching network 902, signal distributors 901, trunk scanners 1005, and the master scanners 1006. The CPD and the CBT also operate in this manner. However, both their input commands and the enable pulses are transmitted to them directly from the SPC.

TSPS center 6 utilizes duplicated circuitry and equipment, in many instances, to provide reliable service upon the occurence of normally expected trouble conditions. Accordingly, many circuits are furnished on a paired basis, with one circuit of the of the pair being designated as the "O" circuit and with the other being designated as the "1" circuit. The SPC's, the CPD's, the CBT's, and the bus system are furnished in pairs and are designated in this manner. Accordingly, the SPC shown as element 1001 on FIG. 10 actually comprises a pair of SPC's, the first of which is SPC 0 and the second of which is SPC 1. The same is true of the CPD's, the CBT'S, and the bus systems. Many peripheral circuits are arranged with duplicated equipment by means of various expedients to provide operational reliability. Some of these circuits, although shown as a single circuit on the drawing, actually comprise a "O" and a "1" half, each of which is independent and each of which may function to continue the operation of our system in the event of the failure of the other half. Others of the peripheral circuits, although not provided on the duplicated basis in their entirety, have the critical portions thereof, such as for example, the input and output circuitry, arranged on a duplicated basis to provide for maximum operational reliability. The complexity of the present drawing has been minimized by showing only a single circuit of a duplicated pair rather than both.

The function of trunk scanner 1005 is to monitor the current state of each TSPS trunk circuit and, upon command, report its findings to the SPC. Trunk scanner 1005 is connected to a plurality of the circuit points within each trunk circuit and each such circuit point is, in turn, individually connected to a different sensing device, termed a "ferrod," in the scanner. Each ferrod includes a plurality of windings, one of which is connected across its associated trunk circuit point so that the magnetic state of the ferrod is controlled by the current applied to its winding by the trunk circuit point to which it is connected. The other windings of each ferrod are wired so that the scanner may be selectively controlled by the SPC to provide an indication of the existing circuit state of any monitored trunk circuit point. The master scanners are similar to the trunk scanners except that they monitor the operational state of circuits other than trunk circuits. These include the service circuits connected to the right side of the position link. Ferrods are further described in Baldwin-May U.S. Pat. No. 3,175,042, Mar. 23, 1965 and in an article "No. 1 ESS Scanner, Signal Distributor, and Central Pulse Distributor," by Freimanis, Guercio, and May, in the Bell System Technical Journal, Vol. 43, page 2255 (Sept. 1964, Part a).

Both scanners operate in response to the reception of coincidental signals in the manner as do the other peripheral circuits, namely, an enable pulse is applied by the CPD to a scanner to unlock its receiving circuitry, and at the same time, a command is transmitted from the SPC via the CBT to the scanner over the 1/N address bus. This unlocks the input registers of the scanner and permits them to register the command currently on the bus. The ferrods of the scanner are arranged into rows of 17 ferrods each. Each command received by a scanner contains information signifying the ferrod row that is to be interrogated. The information resulting from the interrogation is transmitted to the SPC over the bus system 1008 designated "scanner answer bus O and 1." With this arrangement, the transmission of a command to a scanner instruction it to interrogate a particular row of ferrods causes information to be transmitted back to the SPC signifying the current state of all circuit points of the system to which the plurality of ferrods in the interrogated row are connected.

The signal distributor 901 basically comprises a matrix or relay tree-type translator whose function is to receive the microsecond type signals from the CPD and the 1/N address bus and, in turn, transform them into signals required to operate and release magnetic latching relays in the circuits of our system which utilize relays. These relays are primarily contained in the trunk circuits and the service circuits. The signal distributor operates to register SPC commands in the same manner as do the other peripheral circuits, namely, when its receiving circuitry is unlocked in response to the reception of an enable pulse from the CPD, it registers a 1/N address bus command specifying the operation or release of one of the magnetic latching relays under its control.

The trunk link and position link circuits of switching network 902 also operate in response to the reception of the coincidently received signals from the CPD and the 1/N address bus system. The 1/N address bus commands to which they respond cause them to establish link connections between their left side and right side appearances. The paths by which these connections are to be established are not determined by the links, but instead, are determined solely by the SPC in response to the information it receives from its stored program memory.

The following paragraphs will describe the manner in which the embodiment of FIGS. 9 and 10 serves a typical call. A call is initially extended to the TSPS system when a trunk, such as TSPS trunk 32, at supervisory office 5 is seized and, in turn, transmits a signal to the TSPS trunk circuit to which it is permanently connected. The receipt of the signal by the TSPS trunk circuit changes the state of the associated trunk scanner ferrod. The SPC is programmed so that both the trunk scanner and the master scanner scan all of the circuits to which they are connected at a sufficiently high rate so that no newly received information will be lost during the interval between scans. Thus, a short time after the trunk scanner ferrod changes state, the ferrod row in which it is located is scanned and the resulting information transmitted back over the scanner answer bus 1008 to the SPC. The SPC, by means of its memory, identifies the trunk circuit with which the ferrod that has just changed state is associated, and analyzes the previous condition of this ferrod on the preceding scans in order to determine whether this is a new or a recent change of state, so that it may, in turn, determine whether the change of state signifies a newly arrived seizure signal. Once the SPC determines that this is a newly arrived seizure signal, it utilizes its memory to determine certain call parameters, such as for example, the office (or offices) to which the trunk is connected, the nature of the outpulsing that may be received from the local office, the nature of the signals that may be transmitted forward to a connecting office, etc.

The SPC utilizes this information to determine the service required on the call and it then transmits the necessary commands, via the CBT and the CPD, to the switching network, instructing it to interconnect the T and R conductor appearances of the seized TSPS trunk circuit on network 902 with those of a suitable digit receiver, such as digit receiver 903. When the digit receiver is attached, the SPC transmits coincident signals via the CBT and the CPD to the signal distributor, instructing it to operate relays within trunk circuit 32 and the digit receiver 903 so that an acknowledgment of the service request is sent back to the local office in the form of a polarity reversal on the T and R conductors. By means of subsequent polarity reversals, the SPC causes the digit receiver to transmit signals back to supervisory office 5, signaling it to also outpulse the identity of the auxiliary line circuit associated with the calling connection.

The call information outpulsed via the supervisory office is received by the TSPS trunk circuit 32 and extended over its T and R leads via switching network 902 to digit receiver 903. This circuit receives the information and, in response thereto, changes the magnetic state of a unique combination of master scanner ferrods to identify each digit. The master scanner scans all of its ferrod rows, under SPC control, and, in so doing, transmits serially back to the SPC, over the scanner answer bus, information signifying each digit outpulsed from the local office. The SPC operates in response to the receipt of this information and, once outpulsing is terminated, it transmits commands to the switching network instructing it to disconnect the digit receiver and the TSPS trunk circuit. Depending upon the type of call involved, the SPC may, for example, transmit commands to the switching network instructing it to establish a connection between an idle outpulser, such as outpulser 904 on the right side of the link and the calling TSPS trunk circuit on the left side of the link. As will be more apparent from the subsequent description, within certain TSPS trunks the transmission conductors are connected internally within the trunk circuit to its outgoing end and thus extend to the local or tandem office. In other TSPS trunks the transmission conductors provide only a path for outpulsing back to (and through) supervisory office 5.

The SPC determines from its memory the nature and quantity of the data that is to be outpulsed to the local or tandem office or back to supervisory office 5 on each call. The SPC has within its memory the information received from supervisory office 5 and, since an outpulser is currently connected to the calling trunk circuit, the SPC thereupon transmits commands, via the CPD and the signal distributor, to control the outpulser so that the data is transmitted digit by digit via switching network 902 and the trunk circuit, either to the connected local or tandem office or to supervisory office 5 as determined by the type of call involved. After completing its functions, the SPC commands switching network 902 to break down the connection between the outpulser and the TSPS trunk circuit following the termination of the outpulsing operation, thus making the common facilities of TSPS center 6 further available to serve additional calling connections in a similar manner.

2.03 Frequency Shift Outpulser 703

As stated hereinbefore, it is intended for purpose of the illustrative embodiment that the identity of the station with which TSPS center 6 is presently concerned by made available to TSPS center 6 to permit proper processing of the connection. As also discussed hereinbefore, each auxiliary line circuit is uniquely associated with a particular telephone station served by supervisory office 5 and further each auxiliary line circuit is assigned an arbitrary three digit number within supervisory office 5. This section will describe the manner in which this arbitrary three digit number is transmitted by frequency shift outpulser 24 in supervisory office 5 to TSPS center 6.

In this regard, it will be noted that the purpose of FS outpulser 24 is merely to transmit the aforesaid three digits. Thus, though properly classed as a sender, it is intended that outpulser 24 be relatively simple in design and structure because the deletion or prefixing of digits as in the usual case of senders will not be required. However, since the identity of the called station is an integral portion of the intelligence required by TSPS center 6, it is necessary that this information be forwarded promptly to TSPS center 6 to facilitate processing of the call. It is, therefore, intended that FS outpulser 24 shall be a frequency shift pulse sender substantially identical to the type disclosed in U.S. Pat. No. 3,125,642, dated Mar. 17, 1964, and issued to Lynn T. Anderson and Charles E. Kress.

In the description which is to follow in this section, the interrelation and operation of the components of FS outpulser 24 will be set forth in sufficient detail to provide a clear understanding of my invention. It is understood, however, that where still greater detail is desired, the aforesaid patent may be consulted. It will also be apparent from the following description that the particular type of sender utilized in the embodiment is not necessary for the proper functioning of my invention but may, in fact, be replaced by any other one of a number of senders of similar type or function which are well known in the art.

Frequency shift pulse senders are used in data or voice communication systems where transmission of information from one point to another is on a frequency shift pulse signaling basis; namely, information being transmitted by frequency shift pulses applied over the tip and rig conductors of the line. Commonly, a single voice frequency is utilized which is shifted to produce marking signals, each digit or "bit" of information being represented by a different combination of mark (direct-current output) and/or space (no direct-current output) signals, each combination occupying six time spaces. In addition to the combinations assigned to the digits or other information bits, a 5-of-6 combination (KP) is assigned as a "gate opener" pulse and a different 2-of-6 combination is assigned as an "end-of-pulse" signal. These last two combinations serve, respectively, to activate and deactivate the frequency shift receiver or detector.

Figure 7:
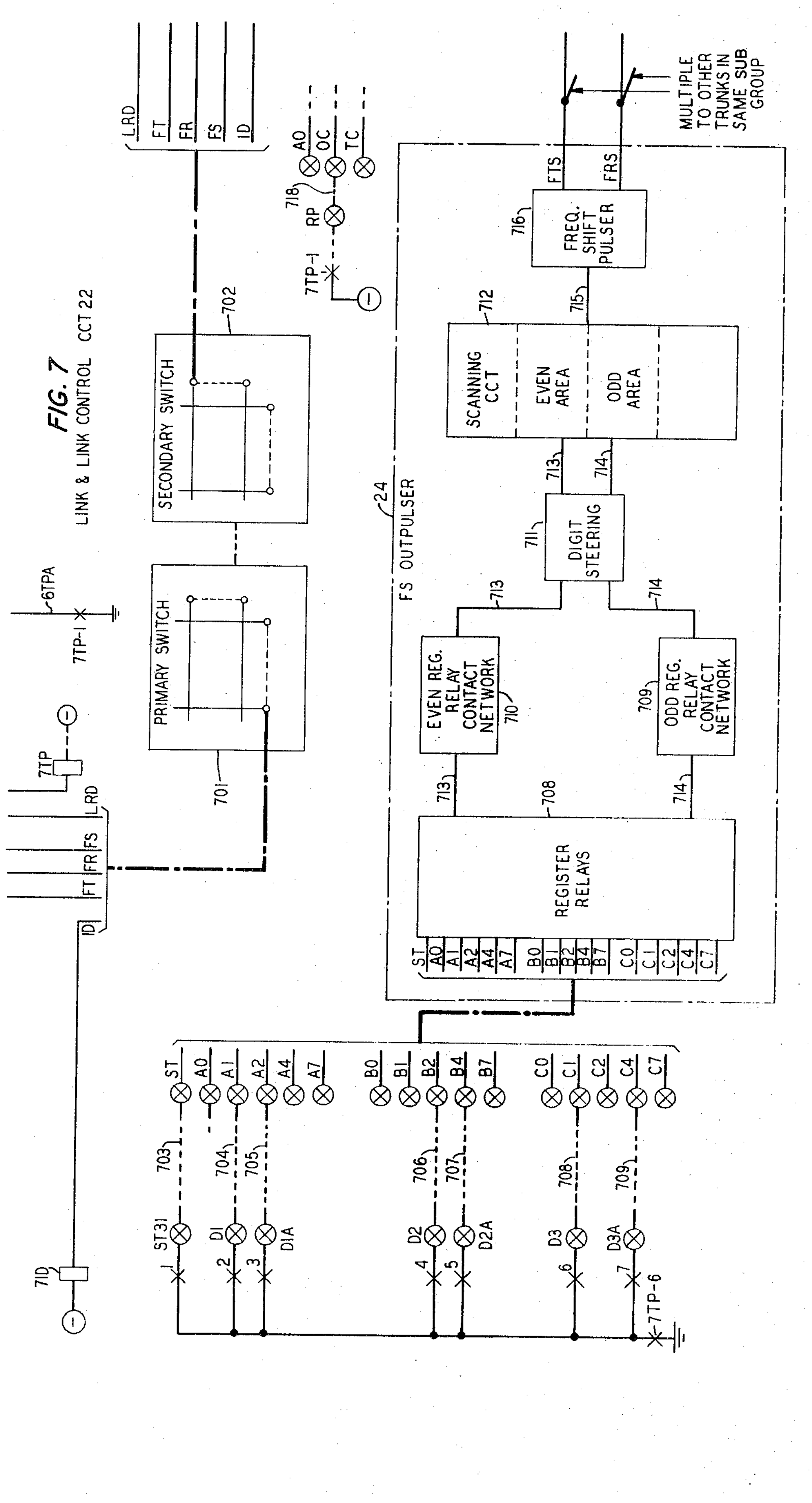

Referring now to FIG. 7: As will be described in detail hereinafter, the arbitrary three digit number assigned to the associated auxiliary line circuit is manifested by ground potential supplied on the well-known 2-out-of-5 basis to the AO through A7 leads, B0 through B7 leads, and CO through C7 leads of FS outpulser 24. In a manner well known in the art, correspondingly designated registered relays are operated in register relay circuit 708. The operation of the aforesaid register relays are manifested in the respective contact networks 709 and 710. Thus, for example, the operated A digit and C digit relays operate their corresponding contacts in the odd register relay contact network 709. In similar fashion, the KP-start signal and B-digit relay contacts are enabled in even register relay contact network 710. As set forth in detail in the aforesaid Anderson et al. patent, when either the odd or even digit is being scanned by scanning circuit 712, the next digit of opposite type is being prepared for scanning via the operation of digit-steering circuit 711. In this respect, it will be noted that scanning circuit 712 is indicated with respective even and odd areas, the respective paths associated with these areas being shown as paths 713 and 714. Actually, paths 713 and 714 each comprise "digit leads" 0, 1, 2, 4, 7, and 10. The information supplied to the respective areas of the scanning circuit is in the nature of particular combinations of "grounds" or "opens" connected consecutively to the respective said paths; these connections are determined, in turn, by the momentary condition (closed or released) of register relay contacts in contact networks 709 and 710.

The paths 713 and 714 are activated, inturn, under control of digit-steering circuit 711 to supply digit information, as determined by the register relays, to the respective even and odd areas of scanning circuit 712. The output from scanning circuit 712 is applied over output path 715 to control frequency shift pulser 716 in the well-known manner which, in turn, is applied via the FTS and FRS leads to the T1 and T2 conductors of the associated trunk in supervisory office 5.

Figure 8:
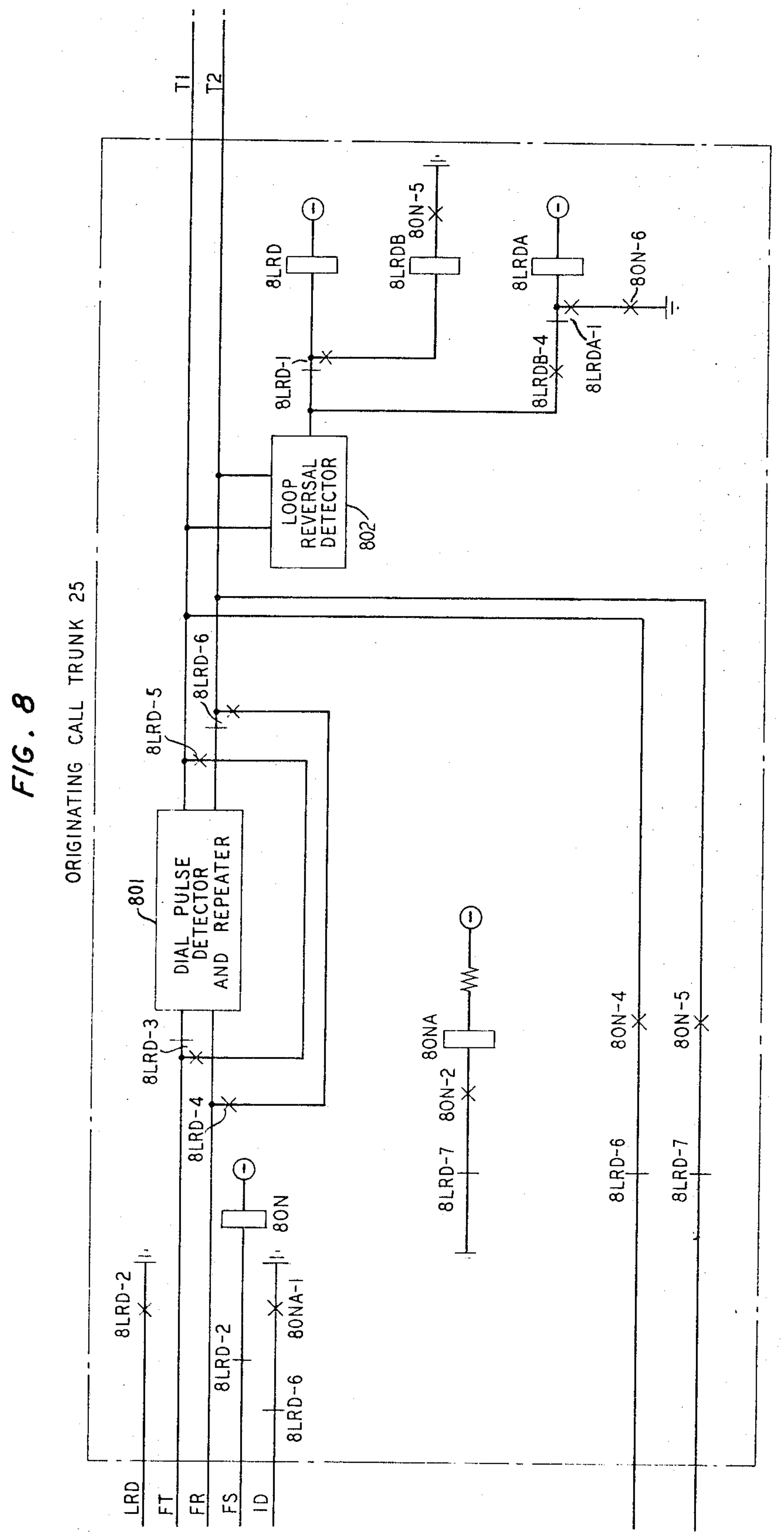

Upon completing its function of transmitting the identity of the auxiliary line circuit involved, FS outpulser 24 is released so as to be available to serve other connections in similar fashion. In this regard, it will be noted, as hereinbefore set forth, that a connection is established through to a specified type trunk in supervisory office 5 on a one-at-a-time basis with respect to trunks in a given subgroup. Thus, for purpose of the embodiment, it is intended that FS outpulser 24, as shown on FIG. 7, serves only one subgroup of trunks which includes originating call trunk 25 (FIG. 8). Thus, other individual outpulsers would be associated with respective other subgroups of trunks to provide for transmission of the auxiliary line circuit identity for each such connection.

2.04 Abbreviated Dialing Feature (Figures 6, 7, 8, 9, and 10)

This section will provide a detailed description of the manner in which subscriber station S1 at local office A is provided with the abbreviated dialing special service feature. As noted earlier, abbreviated dialing permits a privileged subscriber to cause the completion of a calling connection by the mere generation of one or two digits (an "abbreviated dialing code") as opposed to the generation of the seven or ten digit directory number otherwise required. In modern switching systems, this is accomplished by previously storing at a centralized memory location the seven or ten digit number which is subsequently readout of the memory in response to the receipt of the abbreviated code. In some systems the initial storage of this information in the central memory is accomplished by permitting the subscriber to directly control the memory from the subscriber station. In other systems this information is electrically written into the memory by attendants at the central memory location based upon a prior request of the privileged party.

Since the instant invention is principally concerned with the manner in which the feature is implemented within the central office serving the privileged station, as opposed to peripheral features, such as the manner in which the respective directory numbers are stored in memory, the following description will assume that the common memory has been preprogrammed with specified directory numbers identified by predetermined two digit abbreviated codes. It will, however, be obvious from that which is contained hereinafter that the principles of the invention may, in fact, be employed to permit the control of the central memory repertory from the subscriber station in a highly efficient and expeditious manner.

Proceeding now with the description. When station S1 of FIG. 6 goes off-hook to initiate a call, circuit operation takes place in the well-known manner within line circuit 601 in local office A to initiate the activation of line finder 602 to find the calling line. As soon as the line finder operation is started, the line finder will ground the sleeve conductor FS, the effect of which will be described presently.

Figure 6:
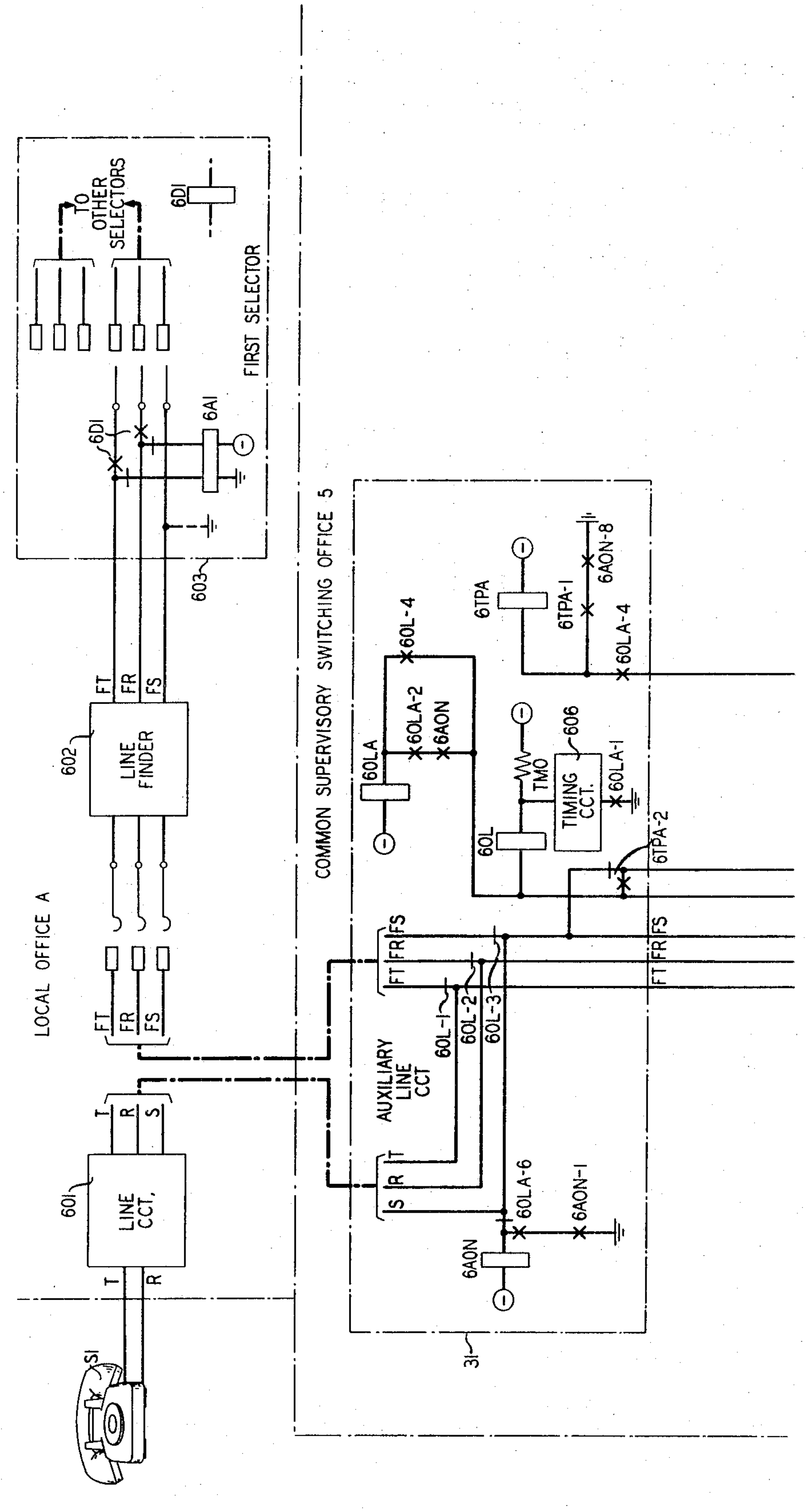
FIGS. 6 through 20 are schematic drawings showing in greater detail the interrelation of the components of the exemplary embodiment.

In FIG. 6, the tip, ring and sleeve conductors T, R and S associated with station S1 extend from line circuit 601 into auxiliary line circuit 31. As described earlier, each auxiliary line circuit in supervisory office 5 is uniquely associated with a particular station in the associated conventional central office. The aforesaid T, R and S conductors extend through auxiliary line circuit 31 in supervisory office 5 back into local office A via the FT, FR and FS conductors and thence to line finder 602 which is arranged in the conventional manner to serve calling stations such as station S1.

When line finder 602 finds the calling line, relay 6A1 in first selector 603 operates. The operating path of relay 6A1 extends from ground in first selector 603 through the left winding of relay winding 6A1, over break contact 6D1, over the tip conductor FT through line finder 602 to the correspondingly designated lead to auxiliary line circuit 31 in supervisory office 5, through released break contact 60L–1, via the T conductor of auxiliary line circuit 31, to line circuit 601 in local office A, and via the subscriber loop over the ring conductor R back through line circuit 601, auxiliary line circuit 31, via released break contact 60L–2, to the FR lead which is connected to line finder 602, via the correspondingly designated lead through a break contact of relay 6D1 to battery through the right-hand winding of relay 6A1.

The operation of relay 6A1 in first selector 603 initiates circuit operations in the selector, as well known in the art, to accomplish a number of switching operations to prepare the first selector for receiving dial pulses from station S1. One of the operations which takes place in the first selector is the grounding of the sleeve conductor FS to hold operated the switch train which has been established to this point. Upon the grounding of lead FS, relay 6AON operates in auxiliary line circuit 31 by a obvious circuit which extends through released break contact 60LA–6. The grounding of the sleeve conductor FS is also arranged, as set forth hereinafter, to initiate circuit operations for seizing an originating call trunk.

As disclosed earlier in some detail, upon commencement of a calling connection in local office A, a connection is established within supervisory office 5 between the auxiliary line circuit and an available originating call trunk via new services link and link control circuit 22. The aforesaid description will not be repeated. Suffice to say that the ground on conductor FS is extended through released break contact 6TPA–2 to cause the operation of auxiliary line circuit 31 preference relay 7TP. As set forth earlier, the operation of the auxiliary line circuit preference relay causes the completion of a connection from the vertical unit termination of auxiliary line circuit 31 on primary switch 701 via an available link extending from primary switch 701 to secondary switch 702, to an available trunk of suitable class such as originating call trunk 25 shown on FIG. 8. The particular type trunk which is to be associated with the auxiliary line circuit at this time is determined by cross-connection jumper 718 which extends from the TP terminal to the OC terminal to indicate that an originating call trunk should be selected at this time. Thus, the enabling of make contact 7TP–1 extends negative battery potential to the RP terminal to provide the aforesaid indication at this time. Thus, in the well-known manner, the FT, FR and FS conductors from auxiliary line circuit 31 are extended via the crossbar switch structure of switches 701 and 702 to the correspondingly designated leads of originating call trunk 25.

At this point it will be noted that the fundamental tip and ring circuit from line circuit 601 extends through auxiliary line circuit 31 in supervisory office 5 and via line finder 602 to first selector 603 in local office A. The fundamental tip and ring circuit also extends to dial pulse detector and repeater 801 in the originating call trunk 25 of supervisory office 5. It will thus be obvious that dial pulses generated from station S1 will be recognized in supervisory office 5 as well as in local office A. Upon completion of the aforesaid connection through to originating call trunk 25, the common control circuitry of a new services link and link control circuit 22 are released so as to be available to serve other calling connections in similar fashion.

As described earlier, in order to provide the special service features, if any, involved on a calling connection, it is necessary to identify the particular calling station. As also noted earlier, this is accomplished in part by preassigning an arbitrary three digit number to each auxiliary line circuit.

Thus, upon the completion of the aforedescribed crossbar switch linkage connection to originating call trunk 25, relay 8ON operates in originating call trunk via the ground present on the FS conductor. Relay 8ONA thereupon operates by an obvious circuit thus enabling make contact 8ONA–1 which extends ground via the ID lead through the crossbar switch linkage of secondary switch linkage of secondary switch 702 and primary switch 701 to the correspondingly designated lead which results in the operation of relay 7ID in new services link and link control circuit 22.

The operation of relay 7ID extends ground through operated make contact 7TP–6 through a plurality of operated make contacts on the 7ID relay to a group of punchings in new services link and link control circuit 22. The punching associated with make contact 7ID–1 is designated ST31. Make contacts 7ID–2 and 7ID–3 apply ground to contacts D1 and D1A, respectively, to thereby provide a two-out-of-five indication of the first digit of the arbitrary three digit number assigned to auxiliary line circuit 31 in a manner which will be more fully described hereinafter. In similar fashion, enabled make contacts 7ID–4 and 7ID–5 apply ground to terminals D2 and D2A to provide a two-out-of-five indication of the second digit of the arbitrary three digit number assigned to auxiliary line circuit 31. Enabled make contacts 7ID6 and 7ID7 apply ground potential to terminals D3 and D3A to provide a two-out-of-five indication of the third digit of the aforesaid arbitrary three-digit number. At this point, an examination of the terminals on the right-hand side of the cross-connection field, shown on FIG. 7, reveals the presence of terminals AO, A1, A2, A4 and A7. In response to the grounding of any two of these terminals, a two-out-of-five indication is manifested which causes the operation of the two-out-of-five register relays (not shown) in circuit block 708 in a manner described hereinbefore. Thus, jumpers 704 and 705, by virtue of their cross connection from terminals D1 and D1A to terminals A1 and A2, respectively, provide an indication that the first digit of the arbitrary three digit number is the digit 3. In similar fashion, ground extended by jumpers 706 and 707 to punchings B2 and B4 indicate that the second digit of the arbitrary three digit number in the digit 6 and, finally, jumpers 708 and 709 extend ground to punchings C1 and C4 to provide an indication that the final digit of the arbitrary digit number is the digit 5. Thus, at this point, register relay circuit 708 has ground potential applied to the input leads indicating that the auxiliary line circuit involved at this time is identified by the arbitrary three digit number 365.

Ground applied simultaneously by jumper 703, grounds the start lead ST to register circuit 708 in FS outpulser 24 to cause the registration of the aforesaid three digit number. As earlier described in detail with respect to FS outpulser 24, for purposes of the embodiment it has been assumed that one outpulser is associated with each subgroup of trunks. Thus, since a connection is completed through to a single trunk in a given subgroup on a one-at-a-time basis, the relatively short holding time of FS outpulser 24 renders it immediately available for use by other trunks in the subgroup upon completion of its transmission of the arbitrary three digit number to TSPS center 6.

Upon the selection of originating call trunk 25, as hereinbefore described, the closure of the loop on conductors T1 and T2 to TSPS trunk 32 results in the SPC connecting a peripheral circuit through switching network 902 to TSPS trunk 32 to serve the call. In the instant embodiment, since TSPS trunk 32 is associated only with originating call trunk 25, the SPC of TSPS center 6 recognizes from the class of TSPS trunk 32 that a digit receiver arranged to receive both frequency shift pulsing and dial pulsing should be connected through to TSPS trunk 32. Accordingly, as earlier described, digit receiver 903 is connected via switching network 902 to TSPS trunk 32 and thus to originating call trunk 25 at this time.

Immediately, upon the connection of digit receiver 903, an FS start signal is transmitted from digit receiver 903 in the well-known manner back to FS outpulser 24 to cause the transmission forward of the arbitrary three digit number assigned to auxiliary line circuit 31. As also noted earlier, the connection of originating call trunk 25 through to a receiver in TSPS center 6 is sufficiently rapid as to take place prior to the receipt of dial tone by the calling station S1. Thus, at this juncture digit receiver 903 has received the identity of the calling station and now awaits the transmission of dial pulses from station S1 in local office A which, as hereinbefore set forth, are also simultaneously detected and recognized in digit receiver 903 in TSPS center 6.

Since we have assumed that station S1 is exercising the abbreviated dialing function, we shall further assume that only two digits are transmitted to indicate an abbreviated code. Upon the storage of this code in digit receiver 903, that circuit has completed its function. The pertinent information is thus detected by master scanner 1006 and conveyed to the SPC for processing as earlier set forth. Simultaneously therewith, digit receiver 903 is released from the connection. Upon completing the processing of the aforesaid information, the SPC directs the establishment of a connection through switching network 902 between TSPS trunk 32 and outpulser 904. Simultaneously therewith, outpulser 904 is primed with the full directory number corresponding to the dialed abbreviated code.

Prior to transmitting this directory number through TSPS trunk 32, a loop reversal signal is generated by outpulser 904 in a manner well known in the art. This loop reversal is detected by loop detector circuit 802, which may comprise any one of a number of configurations well known in the art, to cause the operation of relay 8LRD in originating call trunk 25. When the loop reversal is removed, relay 8LRDB operates in series with relay 8LRD thereupon locking both relays 8LRDB-to ground through enabled make contacts 8LRD-1 and 8ON-5. The enabling of relay 8LRD enables transfer contacts 8LRD-3, 8LRD-4, 8LRD-5, and 8LRD-6 to cause the T1 and T2 conductors to be continuous through to the FT and FR conductors of originating call trunk 25 while simultaneously isolating dial pulse repeater 801 from the connection. The enabling of break contacts 8LRD-6 and 8LRD-7 interrupts the continuity of the FTS and FRS output leads of FS outpulser 24 thereby rendering FS outpulser 24 available for use on other calls while the enabling of make contact 8LRDB-4 prepares the circuit to detect the next loop reversal from the TSPS office.

The enabling of make contact 8LRD-2 also impresses ground on the LRD lead which extends from originating call trunk 25 through switches 702 and 701 in new services link and link control circuit 22 to the correspondingly designated conductor of auxiliary line circuit 31 to cause the operation of relay 60L at this time. The enabling of make contacts 60L-4 operate relay 60L-A in auxiliary line circuit 31 by an obvious circuit. The enabling of break contacts 60L-1, 60L-2, and 60L-3 interrupts the continuity of the FT, FR and FS conductors which extend to line finder 602 in local office A, thereby opening and causing the release of the prior connection extended through to first selector 603.

The enabled condition of make contacts 60LA-4 extend ground present on conductor TPA through enabled make contacts 7TP-1 to complete the operate path of relay 6TPA in auxiliary line circuit 31. The consequent enabling of transfer contacts 6TPA-2 places the operate path of relay 7TP under control of the ground present on the LRD lead. Relay 6TPA locks operated through operated make contacts 6TPA-1 and 6AON-8 to ground.

The aforedescribed operation of relay 60LA also impresses ground potential on timing circuit 606 which comprises any number of configurations well known in the art such that, upon receipt of a ground potential, extends that ground potential to its output lead (designated TMO) within a prescribed interval of time. In the instant case the prescribed interval of time would be an interval sufficient to cause the release of the switch train which extends from line finder 602 forward in local office A through first selector 603. Upon the expiration of the aforesaid interval, ground provided on the TMO lead from timing circuit 606 in auxiliary line circuit 31 causes the shunt release of relay 60L by an obvious circuit. The release of relay 60L restores break contacts 60L-1, 60L-2 and 60L-3 to normal, thereby in effect, reestablishing a new calling connection to line finder 602 in local office A.

Summarizing at this point, station S1 has dialed two digit abbreviated dialing code which has been transmitted to the switching mechanism of local office A in the usual prior art manner. The abbreviated dialing code has also been detected at TSPS center 6 resulting in the determination that the subject call involves an abbreviated dialing code and further resulting in the priming of outpulser 904 in TSPS center 6 with the corresponding directory number. The switch train established in local office A has been released and a new connection commenced as a result of a signal returned from originating call trunk 25 to auxiliary line circuit 31.

Outpulser 904 may commence transmitting the called directory number. It is obvious that the commencement of pulsing by outpulser 904 may result from a signal forwarded from supervisory office 5 to outpulser 904 via the established trunk connection. For simplicity of disclosure, however, we shall assume that digit receiver 903 commences the transmission of the called directory number based upon the elapse of a predetermined interval of time in the well-known manner sufficient to ensure that the prior connection in local office A has been replaced with a new bid to establish a calling connection. Accordingly, at this point outpulser 904 transmits the called directory number through switching network 902 and TSPS trunk 32 in TSPS center 6 over the T1 and T2 conductors to originating call trunk 25 in supervisory office 5, and via enabled make contacts on the 8LRD relay to the FT and FR leads which extend through secondary switch 702, primary switch 701, to the corresponding designated leads of auxiliary line circuit 31, released break contacts on the 60L relay to line finder 602 in local office A to cause the establishment of a calling connection through local office A in the well-known manner.

Upon the completion of pulsing by outpulser 904 in TSPS center 6, a loop reversal signal is forwarded in the well-known manner from outpulser 904 through to originating call trunk 25 in supervisory office 5 via the T1 and T2 trunk conductors. This final loop reversal constitutes a disconnect signal indicating that the circuitry in TSPS center 6 has completed its function.

Thus, at this time loop reversal detector 802 is once again enabled in originating call trunk 25. The detector ground signal output indication is extended at this time through operated make contacts 8LRDB-4 and released break contact 8LRDA-1 to cause the operation of relay 8LRDA at this time. Relay 8LRDA thereupon locks operated by an obvious circuit.

The enabling of break contact 8LRDA-2 interrupts the continuity of the FS lead in originating call trunk 25 thus causing the release of relay 8ON. The release of relay 8ON thereupon restores originating call trunk to normal by opening the operate path of the priorly operated relays 8ONA, 8LRDA, 8LRDB and other control apparatus not shown in detail in FIG. 8. The release of make contact 8LRD-2 in originating call trunk 25 removes ground potential from the LRD lead which extends through link and link control circuit 22 to auxiliary line circuit 31. Relay 7TP in link and link control circuit 22 thus releases at this time. As earlier set forth, the released condition of the auxiliary line circuit preference relay 7TP restores to normal the linkage connection which previously existed through link and link control circuit.

The removal of ground from the LRD lead also opens the priorly described locking path of relay 60LA in auxiliary line circuit 31 thus causing the release of relay 60LA. At this juncture it will be apparent that the existing telephone communications path extends from calling station S1 through line circuit 601, auxiliary line circuit 31, line finder 602, first selector 603 and through the remaining selectors (not shown) to the called station. TSPS center 6 is no longer involved in the calling connection and originating call trunk 25 is also released as earlier set forth. Link and link control circuit 22 is also no longer involved with respect to auxiliary line circuit 31 upon the release of preference relay 7TP. Thus, auxiliary line circuit 31 has operated therein only relays 6AON and 6TPA which remain operated during the progress of the calling connection.

Upon the release of the calling connection, ground is removed in the well-known manner from the sleeve conductor associated with line circuit 601. Accordingly, relay 6AON releases. The release of 6AON restores make contact 6AON–8 to normal thus causing the release of 6TPA. At this point all circuitry is restored to normal and available for use in connection with forthcoming originating calls from stations such as station S1 in the same manner as earlier set forth herein.

Figure 12:
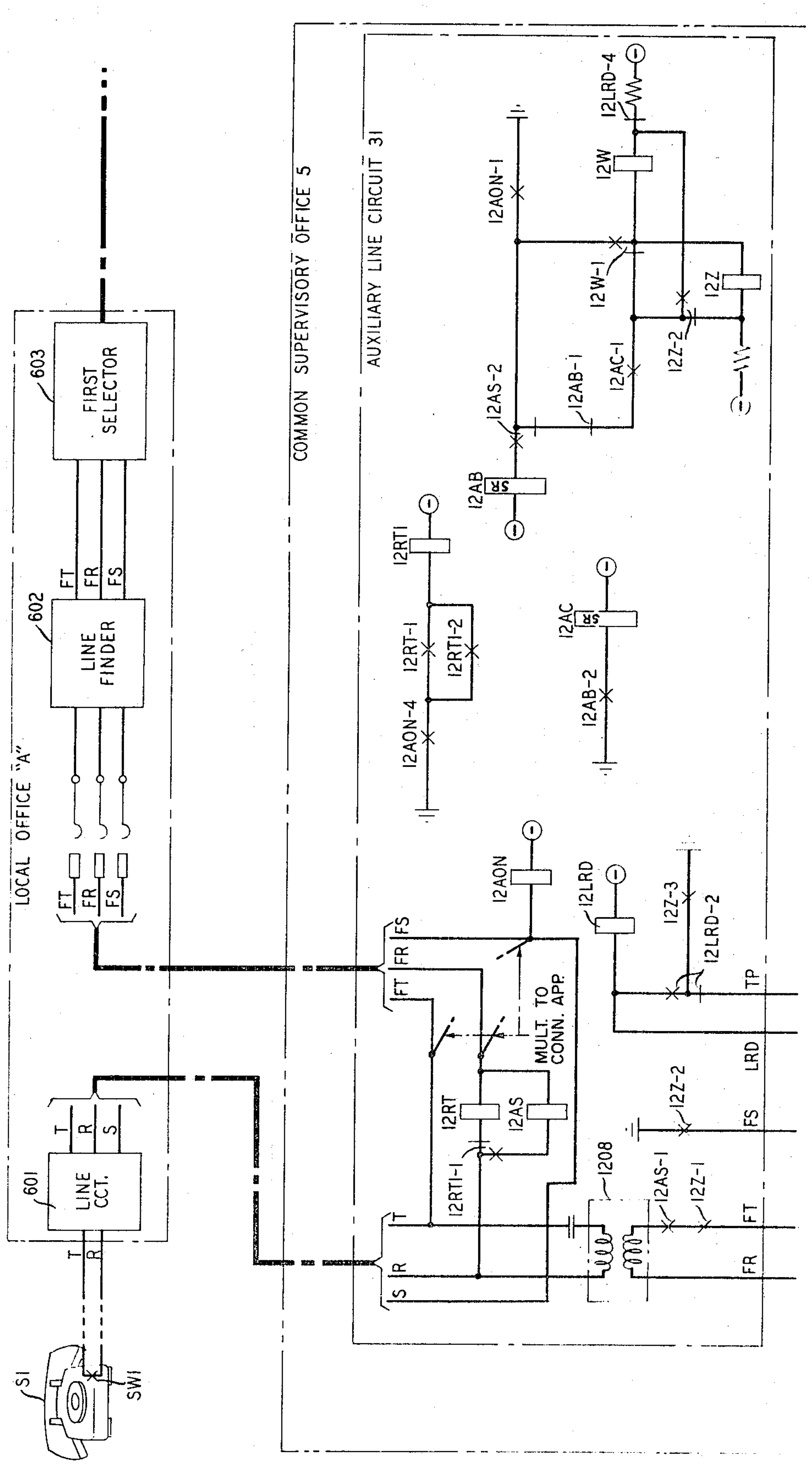
Figure 13:
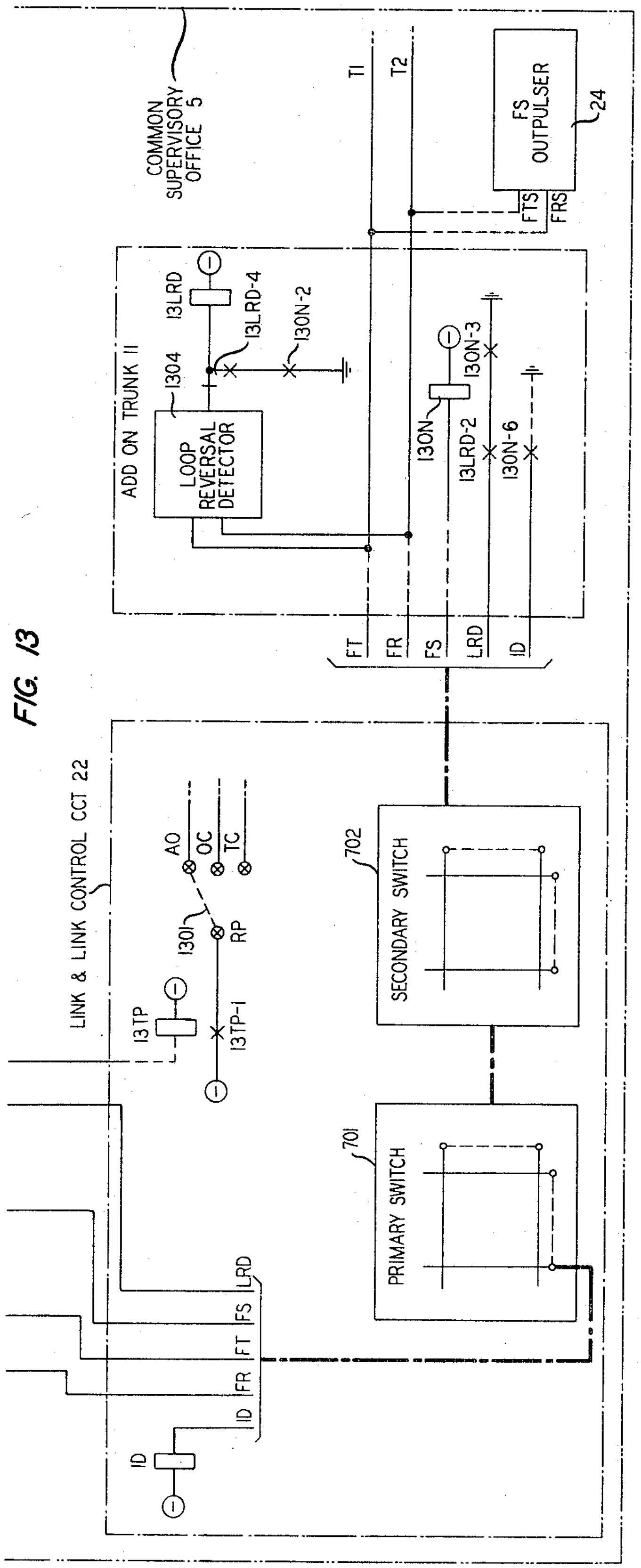
Figure 14:
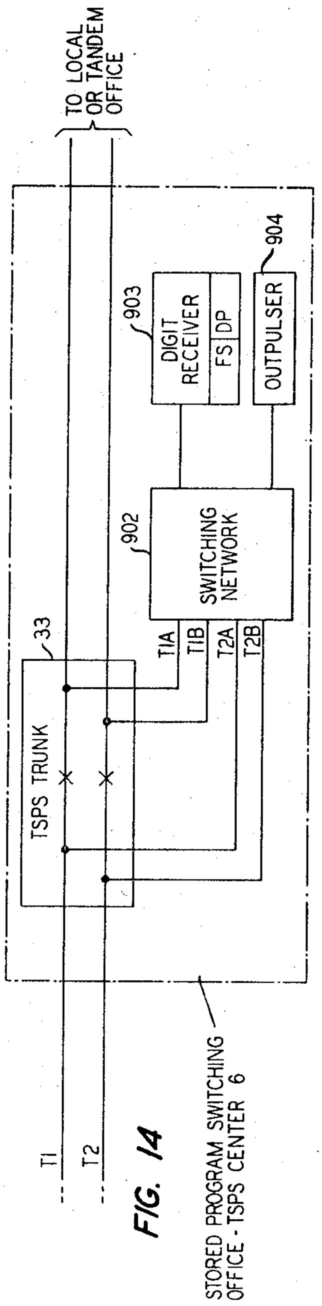

2.05 Add-On Call—(Figures 12, 13 and 14)

This section will describe in detail the manner in which the special service feature known as add-on is provided to station S1 which, as hereinbefore set forth, is a station served by local office A.

Referring now to FIG. 12, we shall assume that an originating call has been previously established from station S1 through to another station (not shown) in a manner similar to that set forth hereinbefore. Thus, a communications path extends from subset S1 via the T and R conductors to line circuit 601 in local office A, and via the T, R and S conductors from line circuit 601 through auxiliary line circuit 31 in supervisory office 5 to the similarly designated leads FT, FR, and FS associated with line finder 602 in local office A and thence through first selector 603 (and other switches, not shown, in the well-known manner) to a called station.

Upon the completion of the aforesaid communications path, relay 12RT operates in series with the subscriber loop which extends from the FR lead of auxiliary line circuit 31 through the winding of relay 12RT, released break contact 12RT1–1, via the R lead, through line circuit 601 in local office A, via the R conductor, through enabled switchhook contacts SW1 at subset S1, and via the T conductor back through line circuit 601 in local office A to the correspondingly designated lead of auxiliary line circuit 31, via the FT conductor to local office A to the correspondingly designated lead of line finders 602 and 603 and forward through the balance of the communications path (not shown) in a manner as hereinbefore described, through to the FR conductor which extends back from first selector 603, through line finder 602 and via the FR lead to auxiliary line circuit 31 to the right side of the 12RT relay winding. Accordingly, relay 12RT operates at this time.

Relay 12AON also operates at this time by an obvious circuit to ground present in the well-known manner on the FS conductor of auxiliary line circuit 31. The enabling of make contact 12AON–4 and 12RT–1 extends ground to cause the operation of relay 12RT1 at this time. Relay 12RT1 thereupon locks operated through enabled make contact 2 to ground present on the relay 12AON–4. The operation of relay 12RT1 enables transfer contact 12RT1–1 thus opening the operate path of relay 12RT releasing that relay and completing the operate path of relay 12AS in a manner identical to that described hereinbefore for relay 12RT.

Digressing momentarily, it will be noted that the circuit action just described is equally true, up to this point, for a call which terminated to station S1. Thus, irrespective of whether station S1 is involved in a terminating call or an originating call, the description contained hereinafter applies to either condition.

The enabling of transfer contact 12AS–2 operates slow release relay 12AB by an obvious circuit at this time. The enabling of make contact 12AB–2 completes the obvious relay path of slow release relay 12AC.

We shall assume that conversation ensues between the subscriber at station S1 and the one party to the connection in the normal prior art manner. It is to be noted that the use of the add-on feature to be described hereinafter is completely at the discretion of the subscriber at station S1. Thus, the subscriber at station S1 may complete the conversation and terminate the call at this point without any further circuit action taking place. However, we shall assume that the subscriber desires to enable the add-on feature at this time. We shall further assume that the subscriber at station S1 advises the party with whom he has been conversing of his intention to add another station to the existing connection and thereupon flashes the switchhook at station S1 to signal the control circuitry of his intention to exercise the feature.

In order to activate the add-on feature, it is customary for a privileged station to provide an enable signal. In the instant embodiment we have assumed that this enable signal is manifested by a switchhook flash of the associated subset viz., a momentary closure of the contacts SW1 associated with the switchhook at subset S1. Thus, in enabling the add-on function, the switchhook at station S1 is flashed once. Upon depressing the switchhook, the aforedescribed operate path of relay 12AS is opened thereby releasing that relay at this time. The release of transfer contact 12AS–2 restores relay 12AB to normal and extends ground present on enabled make contact 12AON–1 through released break contact 12AB–1, enabled make contact 12AC–1, and released transfer contact 12W–1 to complete the operate path of relay 12W. Relay 12W thereupon operates, enabling transfer contact 12W–1 which provides a locking ground for relay 12W and also extends operating ground to the right side of relay 12Z. Relay 12Z, however, remains released at this point because of the shunting ground present on the left side of the relay winding through released break contact 12Z–2. Upon release of the switchhook contacts at station S1, the operate path of relay 12AS is restored. Thus, relay 12AS reoperates and reenables transfer contact 12AS–2 thereby completing the operate path of relay 12AB which reoperates at this time. The enabling of break contact 12AS–2 also removes the shunting ground previously present on the left-hand side of the 12Z relay winding. Relay 12Z accordingly operates at this time, thereby enabling transfer contact 12Z–2 which prepares a shunt release path for relay 12W as will be apparent from that which is contained hereinafter.

As earlier described in detail, within link and link control circuit 22 each auxiliary line circuit is provided with a preference relay, the operation of which causes the completion of a connection through primary switch 701 and secondary switch 702 (typical) to an appropriate trunk. Thus, ground present on the TP lead through enabled make contact 12Z–3 and released transfer contact 12LRD–2 from auxiliary line circuit 31 to link and link control circuit 22 causes the operation of preference relay 13TP at this time by an obvious circuit. Relay 13TP is equivalent in purpose and function to relay 7TP the circuit operation of which has been described in detail in the immediately preceding section. Thus, as set forth in the preceding section, enabled preference relay 13TP activates link and link control circuit 22 to cause the completion of a linkage connection to auxiliary line circuit 31.

Since for this part of the disclosure we have assumed that auxiliary line circuit 31 provides only the add-on feature, the operation of the associated preference relay 13TP is arranged to cause a class indication in link and link control circuit 22 which indicates that an add-on trunk should be associated with auxiliary line circuit 31 through the crossbar switch linkage. Thus, battery potential is extended through make contact 13TP–1 to the RP terminal and is further extended by jumper 1301 to the A-O (add-on) terminal in link and link control circuit 22 to indicate that a connection should be completed at this time from auxiliary line circuit 31 to an available add-on trunk.

We shall assume that link and link control circuit 22 proceeds as hereinbefore described and that the FT, FR and FS conductors associated with auxiliary line circuit 31 are thus extended through primary switch 701 and secondary switch 702 to an available add-on trunk such as add-on trunk 11. The specific manner in which this is accomplished is, of course, essentially identical to the manner in which originating call trunk 25 was connected through to auxiliary line circuit 31 as set forth in detail in the immediately preceding section.

Add-on trunk 11 is shown in block form on FIG. 13. Specific circuit details are not shown within the block since it is intended that add-on trunk 11 shall comprise a conventional outgoing trunk of any one of a number of configurations well-known in the art. Thus, add-on trunk 11 is operative in response to seizure to forward an activating signal to its counterpart trunk in the connected office. Accordingly, upon the enabling of add-on trunk 11, the FT and FR conductors are continuous from add-on trunk 11 back through secondary switch 702, primary switch 701, the correspondingly designated leads to auxiliary line circuit 31, via enabled make contacts 12AS–1 and 12Z–1 through transformer 1208 to the T and R conductors of auxiliary line circuit 31 and to the correspondingly designated leads to line circuit 601 in local office A and thence through to station S1. Add-on trunk 11 is connected on the outgoing side by trunk conductors T1 and T2 to TSPS trunk 33 in TSPS center 6. As set forth hereinbefore in detail, upon the enabling of a TSPS trunk, the SPC causes the completion of a connection through switching network 902 to a suitable digit receiver such as digit receiver 903. The specific manner in which this is accomplished is set forth in the immediately preceding section and will not be repeated herein. However, as also described in the immediately preceding section, upon connection to the activated TSPS trunk, digit receiver 903 receives the identity of the auxiliary line circuit involved in the instant calling connection upon the enabling of frequency shift outpulser 24.

Since add-on trunk 11 is uniquely associated with TSPS trunk 33, the enabling of TSPS trunk 33 informs TSPS center 6 that the connection which is to be served involves an add-on call. Thus, digit receiver 903 may be arranged as well known in the art to return dial tone through to the connected station as an indication that dialing may commence.

We shall now assume that calling station S1 thereupon dials the directory number of the station which is to be added to the existing connection. Dial pulses transmitted on the T and R conductors from station S1 are impressed upon the aforedescribed communication path. Each opening of the subscriber loop for each such dial pulse releases relay 12AS. Accordingly, make contact 12AS–1 repeats the pulses via the FT and FR leads to supervisory office 5. The FT and FR leads extend to add-on trunk 11 as aforesaid where they may be directly extended by metallic conductors to the T1 and T2 output leads (or where they may be detected and repeated if circuit considerations such as loop length so dictates). In any event, the transmitted dial pulses are extended from add-on trunk 11 by the T1 and T2 conductors through TSPS trunk 33 in TSPS center 6 and thence via conductors T2A and T2B of TSPS trunk 33 through switching network 902 to digit receiver 903.

Upon the completion of dialing, TSPS center 6 has available the following information: the present call involves exercise of the add-on feature (by virtue of the fact that TSPS trunk 33 has been enabled); the specific identity of the auxiliary line circuit involved (and thus station involved) as transmitted by FS outpulser 24; and the directory number of the called station as transmitted by the calling station. Upon processing this information, the SPC causes the necessary charging data information to be recorded within TSPS center 6 and connects an outpulser, such as outpulser 904, through switching network 902 to conductors T1A and T1B which, as shown on FIG. 14, are connected through to an associated local or tandem office in a manner well known in the art. The called directory number is thereupon outpulsed by outpulser 904 to cause the completion of the connection through to the called station. We shall assume at this point that the called station thereupon answers and further that the subscriber at station S1 advises the called party that his station has been added to an existing connection in conference fashion.

At this point it will be noted that the T and R leads which extend from line circuit 601 in local office A to auxiliary line circuit 31 in supervisory office 5 now further extend through to link and link control circuit 22 and thus ultimately to the subsequently added station as hereinbefore set forth, and also extend via line finder 602 to the initially called station as also hereinbefore set forth. Accordingly, conversation may ensue between the three parties to the existing connection in conference fashion.

It is obvious that the aforedescribed add-on connection may not have resulted in completion but rather could have encountered a busy condition, overflow condition or no answer condition. Were any of these conditions to occur, the subscriber at station S1 would, of course, desire to abandon the attempted connection either to subsequently reinitiate it, or purely for purposes of resuming the original connection between the initial two parties. The immediately following circuit description will describe the manner in which the subscriber at station S2 may cause the abandonment of the subsequent calling connection independently of whether such abandonment precedes or succeeds the answer of the subsequently called party.

In order to abandon the subsequent calling connection, the subscriber merely flashes the switchhook a total of two times, the first switchhook flash may be as hereinbefore described in order to add the called party to the existing connection or the first switchhook flash may be the initial one of two switchhook flashes in rapid succession in order to abandon the connection before the connection is, in fact, completed through to the called station.

Proceeding now with the description. We shall assume that the subscriber desires to abandon the connection to the added station for any of the foregoing reasons. Accordingly, upon flashing the switchhook, relay 12AS is caused to release and reoperate in sequence. During the released state of relay 12AS, released transfer contact 12AS–2 opens the previously described operate path of relay 12AB releasing that relay and thus restoring break contact 12AB–1 to normal. Ground is thus extended through enabled make contact 12AON–1, through released transfer contact 12AS–2, released break contact 12AB–1, operated make contact 12AC–1, and enabled transfer contact 12Z–2 to cause the shunt release of relay 12W at this time. Relay 12W in releasing opens the previously described operate path of relay 12Z thereby restoring relay 12Z to normal. The reoperation of relay 12AS at the completion of the switchhook flash reenables transfer contact 12AS–2 thereby reoperating relay 12AB.

Summarizing at this time, the apparatus in auxiliary line circuit 31 is thus placed in essentially the same state as existed prior to the initial switchhook flash. Thus, the released condition of make contact 12Z–1 opens the previously closed communications path which extended via the FT and FR conductors through supervisory office 5. The released condition of make contact 12Z–2 also removes the ground previously present on the FS lead extending to supervisory office 5 and in similar fashion the released state of make contact 12Z–3 removes the ground previously extended on the TP lead to supervisory office 5 thus releasing relay 13TP and restoring all circuitry to normal in link and link control circuit 22. Since auxiliary line circuit 31 has been restored to the initial condition which existed upon the completion of the first calling connection through to the initially called party, subscriber station S1 may again reenable the add-on feature as hereinbefore described or may continue the conversation with respect to the initially called station.

It is to be noted that the added station may abandon the conference connection created by the exercise of the add-on feature by the station S1. Where this occurs, all the add-on circuitry is restored to normal without further action by any of the other parties involved in the connection. Upon abandonment of the connection by the added party, TSPS trunk 33 is arranged in a manner well known in the art to return a loop reversal signal via the T1 and T2 leads to add-on trunk 11 in supervisory office 5. Loop reversal detector 1304, which may comprise any number of configurations well known in the art is shown within add-on trunk 11 as being associated with the aforesaid T1 and T2 conductors. Accordingly, upon the occurrence of a loop reversal indicating an on-hook condition of the added station, relay 13LRD operates in response thereto and locks operated by an obvious circuit to ground.

The enabling of relay 13LRD extends ground present on enabled make contact 13ON–3 to the LRD lead of add-on trunk 11 which extends through link and link control circuit 22 to the correspondingly designated lead of auxiliary line circuit 31 thus completing the operate path of relay 12LRD in auxiliary line circuit 31. Relay 12LRD thereupon locks operated through enabled transfer contact 12LRD–2 and enabled make contact 12Z–3 to ground. The enabling of transfer contact 12LRD–2 simultaneously removes the ground previously extended on the TP lead to link and link control circuit 22 thereby causing the release of relay 13TP and thus restoring link and link control circuit 22 to its previously normal state.

The operation of break contact 12LRD–4 opens the previously described operate path of relay 12W thereby releasing that relay and, in turn, causing the release of relay 12Z in a manner hereinbefore described. The release of the associated make contacts 12Z–1, 12Z–2, and 12Z–3 thus restores the apparatus in auxiliary line circuit 31 to the state which existed prior to the exercise of the add-on feature by station S1. Accordingly, the subscriber at station S1 may again enable the add-on feature as hereinbefore described or continue the conversation with respect to the initially called station.

Figure 15:
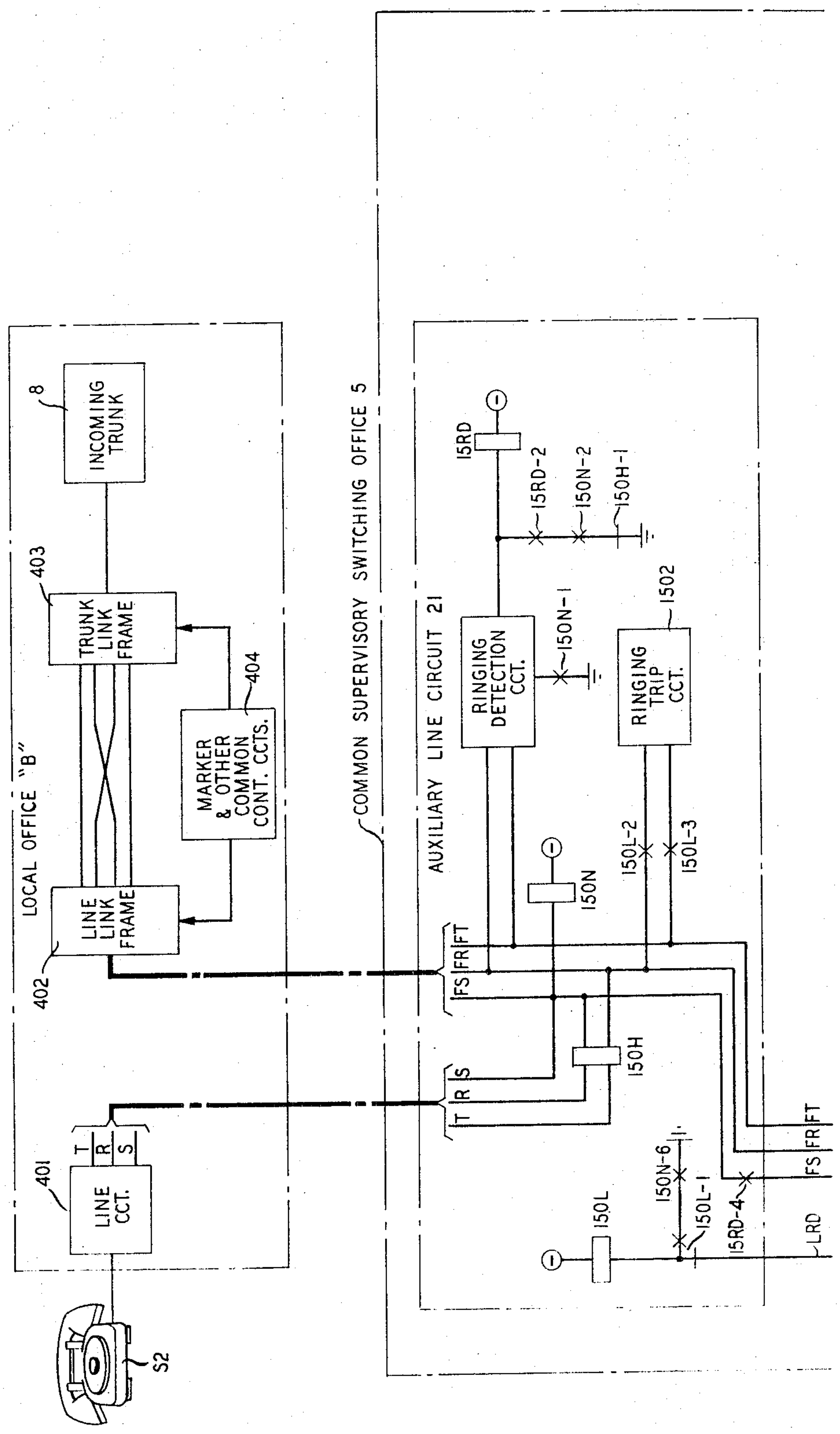
Figures 16, 17:
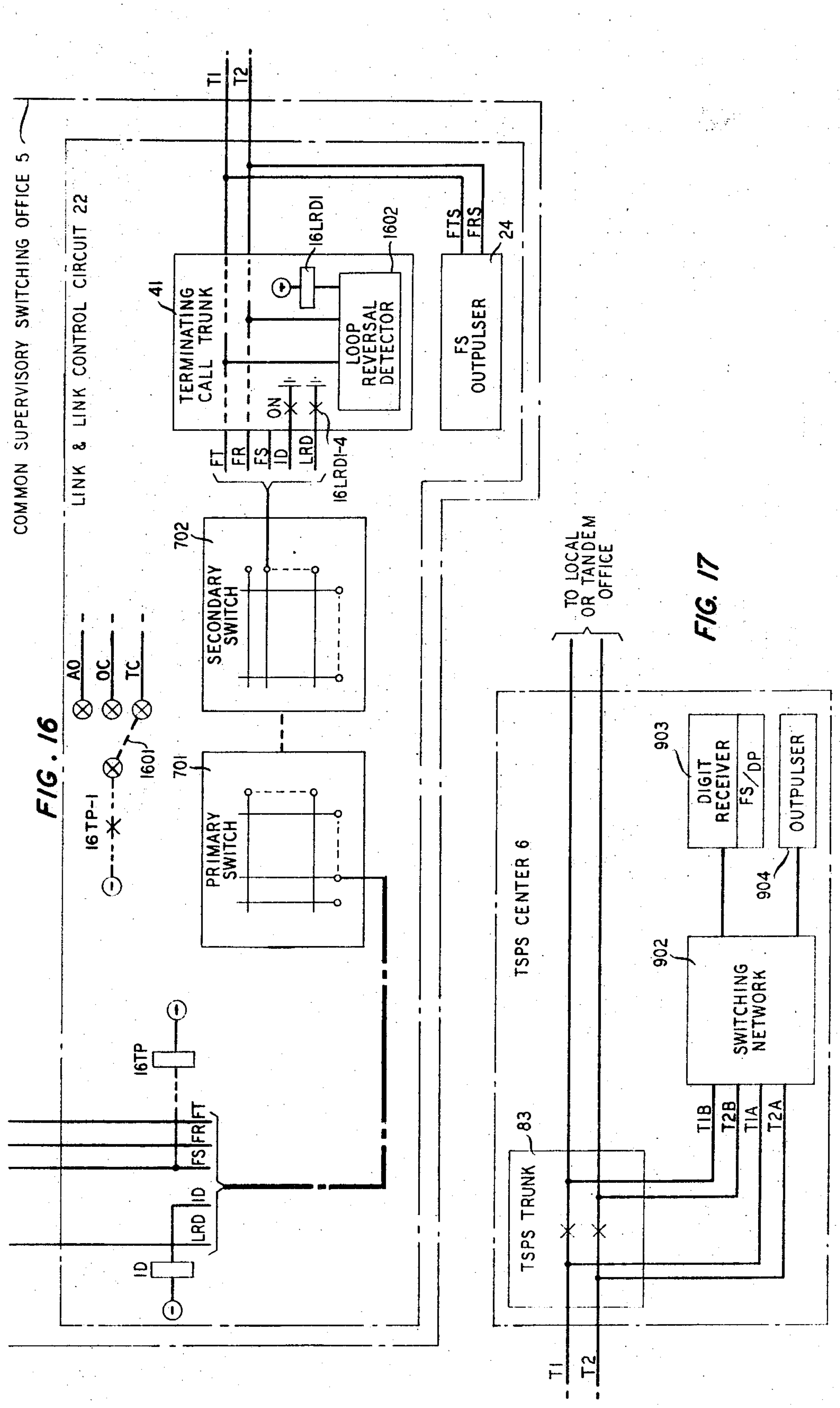

2.06 Call-Transfer—(Figures 15, 16 and 17)

This section will describe in detail the manner in which the special service feature known as call-transfer is provided to station S2 which, as hereinbefore set forth, is a station served by a common control crossbar system designated as local office B.

As noted earlier, call-transfer permits a privileged subscriber to cause the automatic forwarding of a calling connection directed to his station onward to a remote station without requiring additional activity by the calling party. In modern switching systems which comprise a centralized memory this is accomplished by storing the directory number of the remote station which is subsequently read out of the memory in response to each attempt to complete a calling connection to the privileged station. Upon each such attempt the transfer directory number is read out of memory, pulsed forward, and the calling connection is extended from the originally called line in tandem fashion to the remote location. In some systems the initial storage of this information in the memory is accomplished by permitting the privileged subscriber to directly control the memory from the subscriber station. In other systems this information is electrically written into the memory by attendants at the memory location based upon a prior request of the privileged party.

Since the instant invention is principally concerned with the manner in which the call-transfer feature is implemented within the central office serving the privileged station as opposed to peripheral features, such as the manner in which the particular directory number is stored in memory, the following discussion will assume that the memory has been preprogrammed with a specified remote directory number without specifying the particular technique employed to accomplish the storage. It will be obvious, however, that the principles of the invention may, in fact, be employed to permit the privileged station to control the storage of the remote directory number in a highly efficient and expeditious manner.

Proceeding now with the description. As earlier set forth herein, local office B is of the common control crossbar type. By way of a more specific example, local office B is designated as being of the type disclosed in the earlier cited Busch patent. We shall assume that an incoming call has been directed to station S2 in FIG. 15. We shall further assume that incoming trunk 8, which is shown in terminated on trunk link frame 403, has been selected for this purpose. In a manner well known in the art, a linkage connection is established by marker and other common control circuits 404 from the incoming trunk 8 appearance on trunk link frame 403 through to the line appearance of station S2 on line link frame 402. More specifically, the trunk conductors of incoming trunk 8 are connected through to the FT, FR and FS conductors associated with station S2 on line link frame 402. Ringing potential is then applied in the well-known manner to the FT and FR conductors of the station line appearance in order to alert the called station to the incoming connection. Upon completion of the aforesaid connection to the line appearance on line link frame 402, relay 15ON operates in auxiliary line circuit 21 from the ground present on the FS lead to line link frame 402 in the well-known manner.

An examination of FIG. 15 will reveal that the FT and FR conductors from line link frame 402 are continuous through auxiliary line circuit 21 in supervisory office 5 to the T and R conductors, respectively, of line circuit 401 which as earlier set forth is uniquely associated with station S2. Thus, upon the application of ringing potential, the subset at station S2 is signalled in the well-known manner. Concurrently with the enabling of the ringer at station S2, ringing detection circuit 1501 in auxiliary line circuit 21 is enabled. Ringing detection circuit 1501 may comprise any number of configurations well known in the art operable to detect ringing voltage impressed upon the FT and FR conductors. Accordingly, relay 15RD is enabled by ground extended through enabled make contact 15ON–1, ringing detection circuit 1501 and the winding of the 15RD relay to negative battery. Relay 15RD thereupon locks operated through an obvious circuit extending through enabled make contacts 15RD–2 and 15ON–2, and released break contact 15OH–1 to ground. The operation of relay 15RD in auxiliary line circuit 21 detects and records that an incoming calling connection has been directed to station S2.

The enabling of make contact 15RD–4 extends the ground present on the FS lead through to cause the operation of relay 16TP in link and link control circuit 22. Relay 16TP performs essentially the same function as that described hereinbefore for relay 7TP. Thus, the enabling of relay 16TP commences a series of circuit actions which result in the connection of auxiliary line circuit 21 through to an appropriate trunk in common supervisory office 5 which, in turn, is connected to TSPS center 6 as will be apparent from the following. The only distinction in the manner in which link and link control circuit 22 functions with respect to the instant connection, as compared to the aforedescribed connection involving relay 7TP, is that jumper 1601 is cross connected from the RP terminal of FIG. 16 to the TC terminal so as to extend the battery potential from enabled make contact 16TP–1 to thus provide an indication to the link control circuit that the subject auxiliary line circuit is to be associated with a terminating call trunk. Accordingly, link and link control circuit 22 proceeds in a manner identical to that set forth in detail hereinbefore to cause the completion of a linkage connection from auxiliary line circuit 21, through primary switch 701, secondary switch 702 to an available terminating call trunk such as terminating call trunk 41.

For purposes of the illustrative embodiment, it is intended that terminating call trunk 41 shall be a conventional outgoing trunk comprising any one of a number of configurations well known in the art. Thus, in FIG. 16 terminating call trunk 41 is shown in a skeletonized version in order to simplify the following description.

Upon the enabling of terminating call trunk 41, TSPS trunk 83 in TSPS center 6, which is exclusively and permanently associated with terminating trunk 41, is enabled in a manner identical to that set forth in detail hereinbefore for other TSPS trunks such as TSPS trunk 32. Upon the enabling of trunk TSPS 83, the SPC in TSOS center 6 recognizes from the class of trunk 83 that a potential call-transfer situation is presented. Thus, as described in detail hereinbefore, a suitable receiver, such as digit receiver 903, is connected through switching network 902 by the SPC to the T1A and T2A conductors associated with TSPS trunk 83.

As also described in detail in detail hereinbefore, upon the connection of receiver 903, FS outpulser 24 forwards the three-digit number identifying the auxiliary line circuit involved. Upon registration of this information, the SPC in TSPS center 6 has available to it sufficient information to process the call. This specific identity of the auxiliary line circuit (which is unique to station S2) is thereupon translated by the SPC into the specific directory number of the remote transfer location which has been previously recorded in the memory. Obviously, if the feature has not been enabled, no such directory number will, in fact, be recorded in the memory and a release signal will be returned to common supervisory office 5.

However, since we have assumed that a call-transfer number has, in fact, been recorded, the SPC automatically causes the release of digit receiver 903 and connects a suitable outpulser, such as outpulser 904, through switching network 902 to the outgoing side of TSPS trunk 83. Outpulser 904 is thereupon primed by the SPC with the directory number of the call-transfer station which is thereupon outpulsed to the connected toll office (not shown) for cal completion.

Prior to forwarding the called (FIGS. number, outpulser 904 is advantageously arranged to return a loop reversal signal is terminating call trunk 41 in common supervisory office 5 as an indication that a transfer number has been recorded in memory and thus the call is in the process of being forwarded. This loop reversal is detected by loop reversal detector 1602 in terminating call trunk 41. Loop reversal detector 1602 may comprise any number of configurations well known in the art such that upon detecting a reversal of the associated trunk conductors, ground potential is applied by the detector to cause the operation of an associated relay, such as relay 16LRD–1 in terminating call trunk 41.

The subsequent enabling of make contacts 16LRD1–4 impresses ground on the LRD conductor which extends from terminating call trunk 41 through secondary switch 702, and primary switch 701 to the correspondingly designated lead in auxiliary line circuit 21, and through released break contact 15OL–1 so as to cause the operation of relay 15OL at this time. Relay 15OL thereupon locks operated through enabled make contacts 15OL–1 and 15ON–6 to ground. Enabled make contacts 15OL–2 and 15OL–3 thereupon complete an obvious path between the FR and FT conductors associated with the calling connection and the ringing trip circuit 1502. Ringing trip circuit 1502 may comprise any number of configurations well known in the art which is effective to impress an instantaneous DC shunt across the conductors with which it is associated. The effect of the momentary DC shunt is to cause the cessation of ringing ("ringing trip") in the well known manner. Since the insertion of the DC shunt is momentary in nature, the well-known result is to cause the cessation of the application of ringing potential by the associated switching system. However, the interval of the shunt insertion is selected so as to be insufficient in duration to cause the commencement of charging. Thus, at this point auxiliary line circuit has been advised that the calling connection is in the process of completion through common supervisory office 5, TSPS center 6 and an associated local or tandem office to the remote transfer station. It is obvious that the foregoing ringing trip function takes place in a relatively short interval of time. Thus, upon the application of ringing to the transfer station at the distant office, the time lapse is insufficient to be detectable to the calling station. It is also obvious that the audible ringing sound will be transmitted back to the calling station in the conventional manner via the established communication path. In similar fashion, overflow or busy tone signal would also be returned to the calling station if the subsequent circuit conditions so dictate.

We shall assume for purpose of the embodiment that the receiver at the remote transfer location is placed in an off-hook condition in answering the call. It will thus be obvious that a completed communication path exists from the calling station (not shown) through incoming trunk 8 in local office B, trunk link frame 403, line link frame 402, auxiliary line circuit 21 in common supervisory office 5, primary switch 701 and secondary switch 702 in link and link control circuit 22, terminating call trunk 41, TSPS trunk 83 and via the local or tandem office (not shown) to the remote transfer location.

Upon the subsequent abandonment of the connection by the calling parties, the connection is released in the well-known fashion thereby releasing the various component elements hereinbefore described and resulting in the removal of ground from the FS lead of auxiliary line circuit 21 in common supervisory office 5. Relay 15ON in auxiliary line circuit 21 thereupon releases restoring relays 15RD and 15OL to normal and resulting in the subsequent release of relay 16TP in link and link control circuit 22 thus preparing the circuitry for future use in connection with subsequent calls of the same nature.

Digressing momentarily, it will be noted that with respect to stations arranged for the call-transfer feature, the aforedescribed circuit action will take place for all incoming calls to the privileged station. It is obvious that during many intervals of time the call-transfer feature will not, in fact, be enabled and thus the customer will be available at station S2 to answer the call which has been directed to that station. Assuming that station S2 is placed in an off-hook condition in order to answer the call, relay 15OH in auxiliary line circuit 21 operates by an obvious circuit in series with the called loop which extends via the T and R conductors through the switchhook contacts of station S2. Upon the operation of relay 15OH, enabled break contact 15OH–1 causes the release of the 15RD relay. The release of relay 15RD thereupon opens the path, which extended via the FS lead to link and link control circuit 22, thereby removing ground potential from relay 16TP in link and link control circuit 22 and thus causing abandonment of an attempt to complete the call-transfer connection through TSPS center 6.

It is also to be noted that, upon the tripping of ringing in local office B during the call-transfer circuit operation as earlier described, charging does not commence with respect to the calling connection. However, employing techniques well known in the art, TSPS center 6 may readily be arranged to detect and record the extension of the subject connection and to cause the billing of the forward portion of the connection to the privileged station. Obviously, the calling party is billed in the usual fashion based upon the directory number of the station to which the call was initially directed.

It will also be noted that the illustrative arrangement of auxiliary line circuit 21 in no way effects the use of station S2 for originating calls through local office B in the well-known manner independently of whether or not the call-transfer feature has been enabled.

Figure 18:
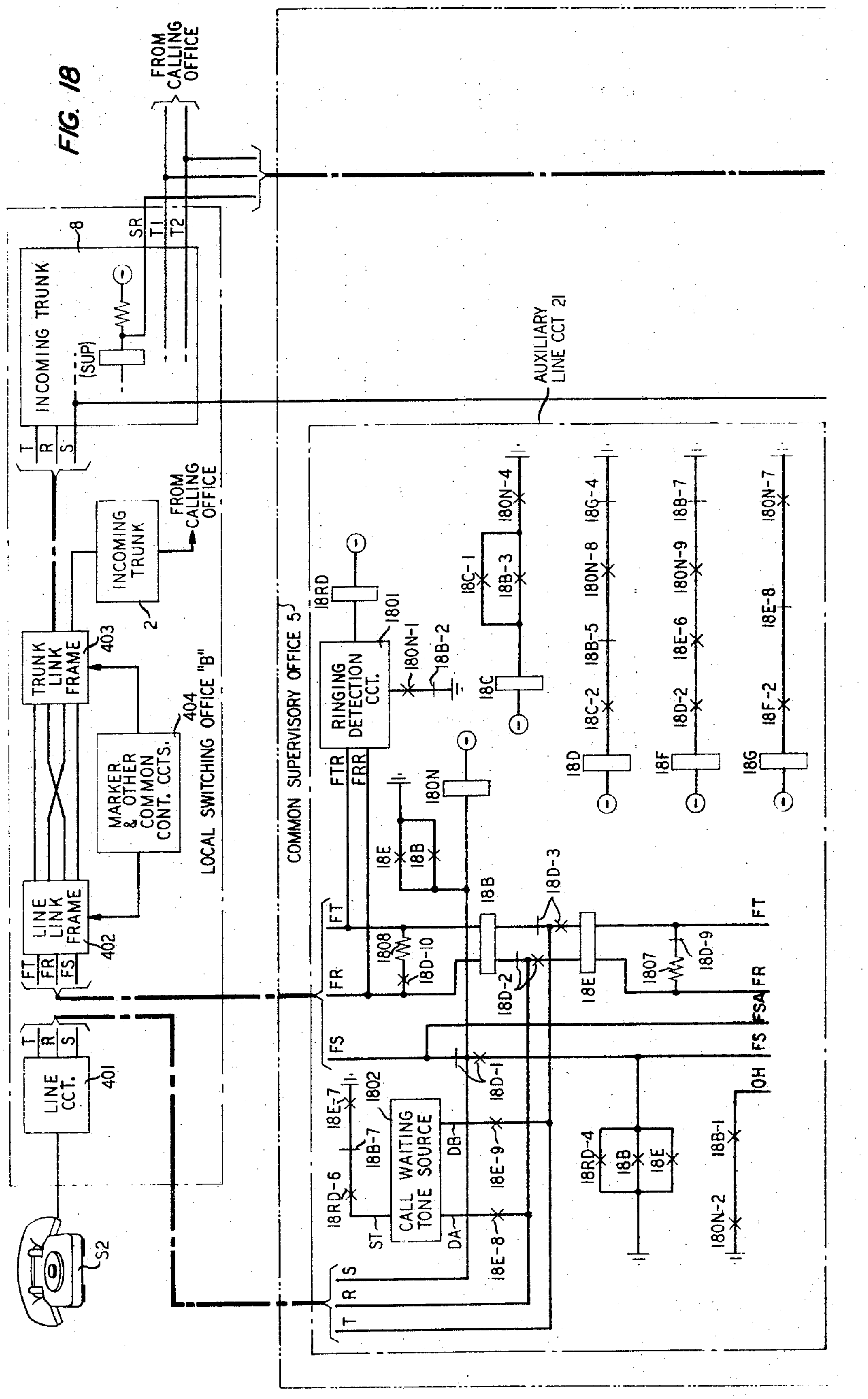
Figure 19:
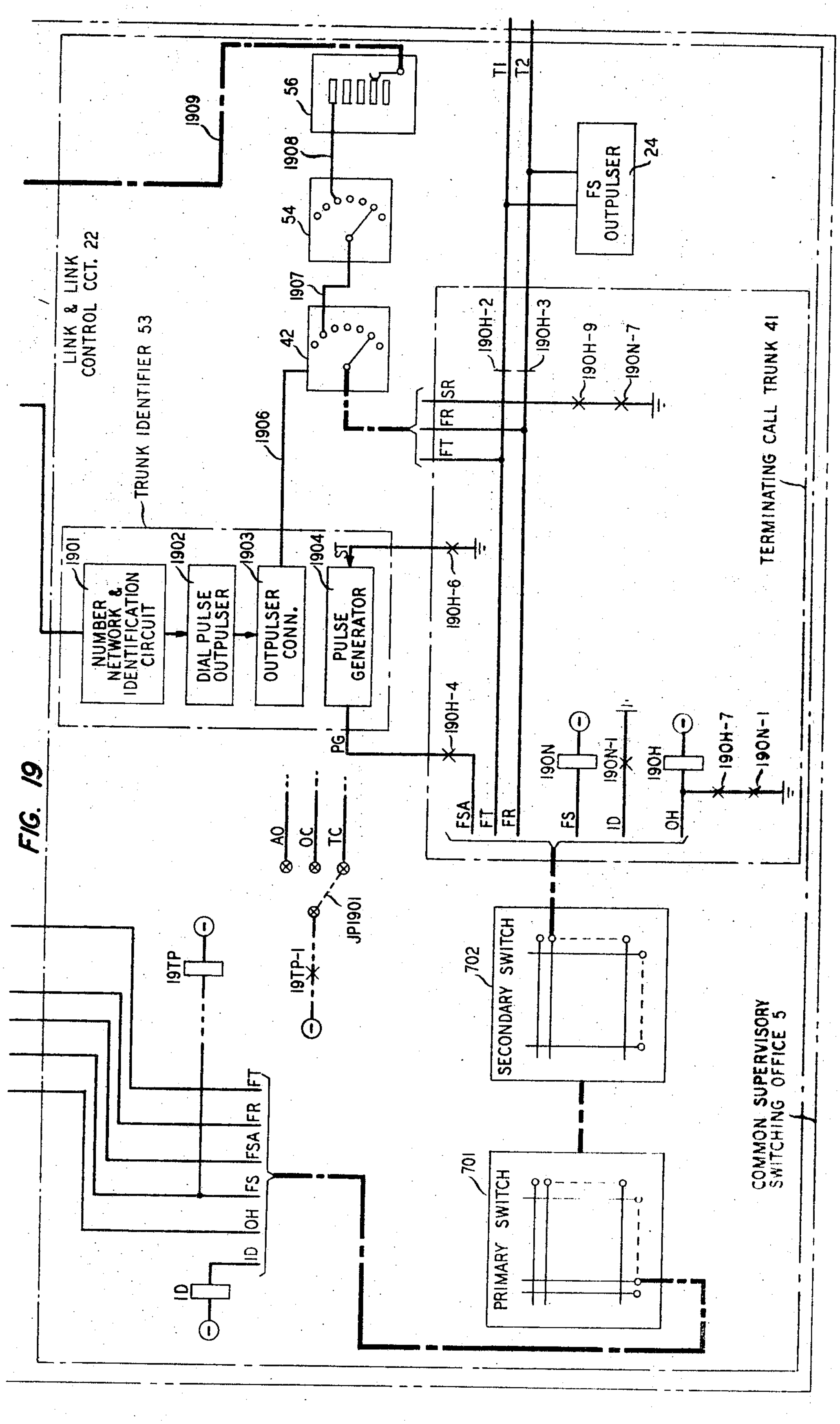
Figure 21:
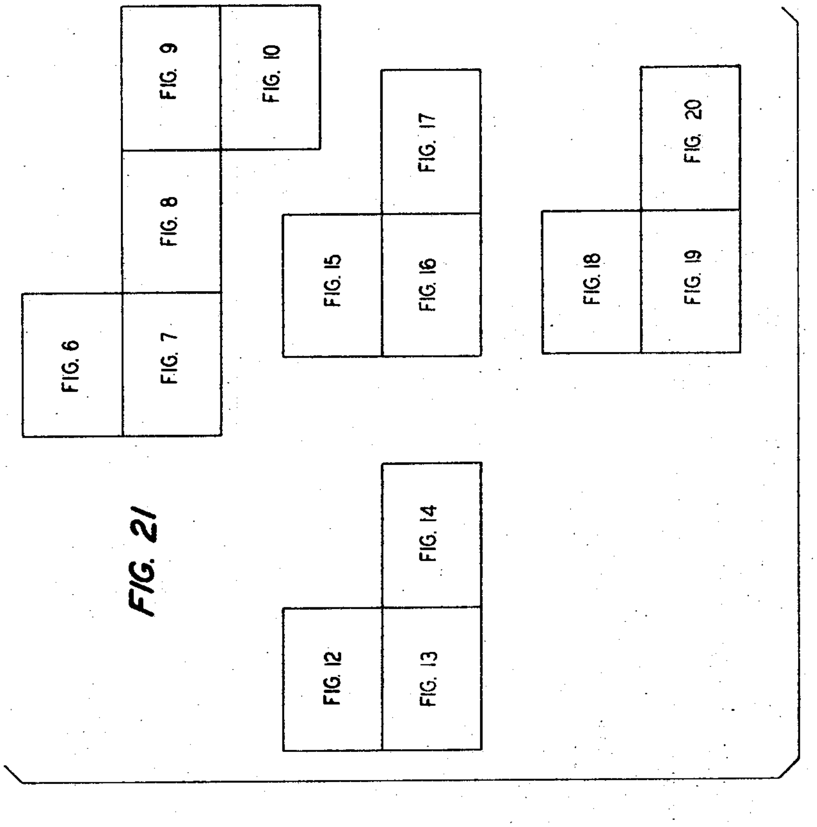
FIG. 21 shows the manner in which the other FIGS. should be arranged.
Figure 20:
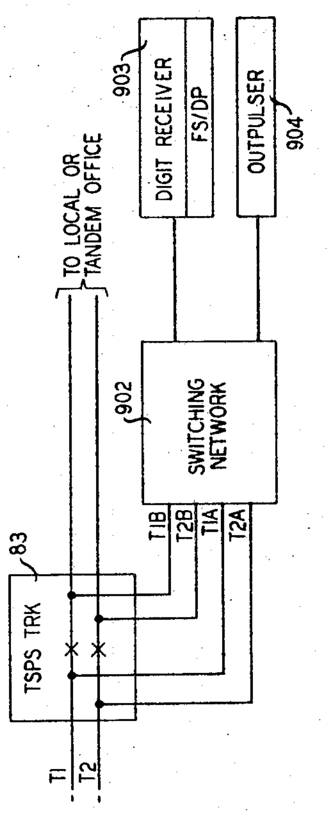

2.07 Call Waiting—(Figures 18, 19 and 20)

This section will describe in detail the manner in which the special service feature known as call waiting is provided to station S2 which, as hereinbefore set forth, is a station served by a common control crossbar system designated as local office B. As noted earlier, the call waiting feature permits a privileged station while engaged in an existing telephone conversation to be alerted to the fact that a subsequent calling connection has been directed to his station. In modern system arrangements the privileged station is further arranged to cause the existing connection to be placed in a hold condition concurrently with connection of the privileged station through to the subsequent calling party.

Proceeding now with the description. We shall assume that station S2 is initially in an idle(on-hook) condition and that a calling connection is directed to station S2 from another station (not shown). Referring to FIG. 18, we shall further assume that the incoming call is completed via incoming trunk 8 which appears on trunk link frame 403 in local office B. In a manner well known in the art, upon the enabling of an incoming trunk, such as incoming trunk 8, marker and other common control circuits 404 function to receive the directory number information of the called station and proceed to establish a linkage connection from trunk link frame 403 through to the unique appearance of the called station on line link frame 402. An examination of FIG. 18 reveals that auxiliary line circuit 21 is serially inserted between line circuit 401 and the conversational line appearance of the called station on line link frame 402.

Upon the completion of the aforesaid connection in the conventional manner, ringing is applied to the FT and FR conductors which manifest the line appearance of station S2 on line link frame 402. Thus, ringing is commenced to signal the called condition of station S2. This ringing potential is extended from the FT and FR leads of line link frame 402 to the correspondingly designated leads of auxiliary line circuit 21, through the left and right windings of relay 18B and via released break contracts on the 18D relay, via the T and R leads of auxiliary line circuit 21 to the correspondingly designated leads of line circuit 401 in local office B and thence to the called station in the well-known manner. Thus, as well known in the art, ringing commences at station S2. Concurrently with the ringing at station S2, the ringing potential applied to the FR and Ft leads of auxiliary line circuit 21 is extended via the FTR and FRR leads to ringing detection circuit 1801.

Ringing detection circuit 1801 may comprise any number of configurations well known in the art such that upon the application of ringing potential to the input leads a ground signal is passed through the detection circuit to cause the operation of an associated relay. Accordingly, upon the enabling of ringing detection circuit 1801, ground potential is extended through released break contact 18B–2 and 18ON–1 to cause the operation of relay 18RD at this time. The enabling of make contact 18RD–4 extends ground potential to the FS lead of auxiliary line circuit 21 and thus to the correspondingly designated lead of link and link control circuit 22 and thus also through the winding of relay 19TP in the latter circuit. Relay 19TP performs a function substantially identical to relay 16TP as hereinbefore set forth. Upon its operation, relay 19TP is arranged to cause the completion of a connection between auxiliary line circuit 21 and a suitable trunk leading to TSPS center 6. In the instant case enabled break contact 19TP–1 extends battery via the RP terminal and jumper 1901 to the TC terminal in link and link control circuit 22 to provide an indication in a manner hereinbefore set forth that the appearance of auxiliary line circuit 21 on primary switch 701 should be extended via a linkage connection to the appearance on secondary switch 702 of an available terminating call trunk. This connection is thereupon established in a manner identical to that described hereinbefore. Accordingly, the FT, FR, FSA and OH leads associated with auxiliary line circuit 21 are extended through primary switch 701 and secondary switch 702 to an available terminating call trunk, such as terminating call trunk 41. Relay 19ON thereupon operates in terminating call trunk 41 via ground extended on the FS lead as earlier described from enabled make contact 18RD–4 in auxiliary line circuit 21.

From the foregoing it will be obvious that the FT and FR leads in auxiliary line circuit 21 are thus extended through terminating call trunk 41 and via conductors T1 and T2 to the associated TSPS trunk 83 in TSPS center 6. Accordingly, as earlier described, the SPC in TSPS center 6 is alerted to an incoming call involving a special service feature.

At this juncture, in a manner identical to that described hereinbefore, ground extended on the ID lead from terminating call trunk 41 causes the identification of the particular auxiliary line circuit involved in the subject call. As also set forth in detail hereinbefore, upon request, FS outpulser 24 forwards this information to TSPS center 6 and thus to a digit receiver, such as digit receiver 903, which has been connected via switching network 902 to the T1A and T2A conductors associated with TSPS trunk 83. Deviating momentarily, it will be recognized that the calling connection has progressed thus far in a manner substantially identical to that set forth hereinbefore for the call-transfer feature. Thus, at this juncture the SPC ascertains from the information recorded in the memory whether or not the call-transfer feature is to be exercised. For simplicity of the disclosure, we shall assume that the call-transfer feature has not been activated and further that the subscriber at station S2 places the subset in an off-hook condition in answer to the incoming call.

Referring now to FIG. 18, it will be recognized that the off-hook condition of station S2 extends the continuity of the T and R leads from line circuit 401 through the winding of relay 18B to the FR and FT conductors which, as earlier described, extend through to incoming trunk 8. Thus, in response to the off-hook condition of station S2, relay 18B operates. At this point conversation may ensure between the calling and called parties via the established communication path in the conventional manner.

The enabling of make contacts 18B–3 completes the obvious operate path of relay 18C at this time. The operation of relay 18C provides a memory indication within auxiliary line circuit 21 that relay 18B has been enabled in response to an answer by the called station. Enabled break contact 18B–2 opens the earlier described operate path of relay 18RD releasing that relay at this time. The enabling of make contact 18B1 extends ground present on enabled make contact 18ON–2 to the OH lead which extends from auxiliary line circuit 21 through the earlier described linkage path in link and link control circuit 22 to the correspondingly designated lead of terminating call trunk 41. Relay 19OH thereupon operates and locks to ground through enabled make contacts 19OH–1 and 19ON–1. Operated break contacts 19OH–2 and 19OH–3 interrupt the continuity of the T1 and T2 leads which extend to TSPS center 6 thereby abandoning the earlier described bid for processing by the SPC through TSPS center 6.

As earlier set forth in the general description, it is necessary at this juncture for supervisory switching office 5 to ascertain the identity of the incoming trunk associated with the aforedescribed calling connection. It is obvious that this may be accomplished in a number of ways employing techniques well known in the art. For example, each trunk in a modern switching office has associated therewith a sleeve lead, or equivalent conductor, which is unique to each trunk and which is provided for signalling purposes in connection with the establishment of calling connections through the office. It is thus obvious, upon the application of a suitable distinguishing signal to this conductor coupled with the provision of an identification network associated with all trunks involved, the identity of the particular trunk may be readily ascertained. Since the particular manner in which this identification is performed is merely peripheral with respect to the instant invention, we shall assume that the trunk involved is identified employing the foregoing technique; namely, the impression of an identifying signal upon the sleeve lead of the associated connection (for a more detailed explanation of this technique see, for example, "Automatic Number Identification and its Application to No. 1 Crossbar, Panel and Step-by-step Offices" by D. H. Pennoyer, appearing in the Bell System Technical Journal, Volume 37, pages 1295—1318; and also "ANI for Small Step by Step Offices" by P. A. Ghiloni and H. R. Moore appearing in the Bell Labs Record June 1966 at page 201.)

Proceeding now with the description. The enabling of make contact 19OH–6 extends ground potential on the ST lead from terminating call trunk 41 as an enabling signal to pulse generator circuit 1905 in trunk identifier 53. Pulse generator 1904 is arranged, as well known in the art, to respond to a ground signal on the ST lead by generating a high frequency signal via its output at the PG lead of FIG. 19. This high frequency signal is extended by the FSA conductor of terminating call trunk 41 through the aforedescribed linkage connection of link and link control circuit 22 to the correspondingly designated lead of auxiliary line circuit 21, to its juncture with lead FS within auxiliary line circuit 21, and thus to the correspondingly designated lead on line link frame 402 in local switching office B and ultimately to the S lead of incoming trunk 8 via the earlier described linkage connection extending between line link frame 402 and trunk link frame 403. This high frequency signal is thus extended from the S conductor of incoming trunk 8 to the number network and identification circuit 1901 in trunk identifier 53. At this point, the identity of the incoming trunk involved in the instant calling connection is manifested by the operated apparatus in number network and identification circuit 1901. This information controls dial pulse outpulser 1902 which is connected via outpulser connector 1903 to first selector 42. As earlier set forth, first selector 42 is uniquely associated with terminating call trunk 41. This selector and second selector 54 and connector 56 illustrate a relatively simple switching network for extending connections between terminating call trunks, such as terminating call trunk 41 and various incoming trunks, such as incoming trunk 8.

Upon the enabling of dial pulse outpulser 1902, dial pulse signals are extended via cable 1906 to cause the enabling of first selector 42 in a manner well known in the art. In similar fashion, subsequent dial pulses control second selector 54 and connector 56 so as to result in the extension of the FT, FR and SR leads of terminating call trunk 41 through first selector 42 via cable 1907, second selector 54 via cable 1908 and connector 56 via cable 1909 to the correspondingly designated leads of incoming trunk 8 in local office B. Upon completing its function, trunk identifier 53 is released in the conventional manner.

The foregoing circuit action in connection with the enabling of first selector switch 42, second selector switch 54 and connector 56 results in the extension of the FT and FR leads from auxiliary line circuit 21 through the earlier described linkage path of link and link control circuit 22, via terminating call trunk 41 and the aforesaid selector and connector switches to the T1 and T2 conductors associated with the incoming calling connection. Ground potential extended from enabled make contacts 19ON–7 and 19OH–6 to the SR lead and via the linkage connection to the aforesaid selectors and connector stations results in the shunt release of the supervisory relay (SUP) in incoming trunk 8. The release of the supervisory relay in incoming trunk 8 causes the release of the earlier described linkage connection extending through local switching office B in the well-known manner. At this juncture it will be recognized that the calling connection now extends only through supervisory switching office 5 to called station S2. It will be further recognized that the aforedescribed circuit operation takes place in an extremely brief interval of time without awareness on the part of the calling and called stations.

Referring now to FIG. 18, upon the release of the calling connection through local office B, as above described, the operate path of relay path 18B is opened. Relay 18B accordingly releases thereby restoring break contact 18B–5 to normal. Relay 18D thereupon operates through enabled make contact 18C–2, released break contact 18B–5, enabled make contact 18ON–8 and released break contact 18G–4. The operation of relay 18D enables transfer contacts 18D–1 and 18D–2 and 18D–3 thereby transferring conductors T, R and S from line circuit 401 through to the earlier described connection to link and link control circuit 22. Relay 18E thereupon operates in a manner essentially identical to that set forth hereinbefore for relay 18B. Relay 18F also operates at this time by ground extended through enabled make contacts 18D–2, 18E–6 and 18ON–9 and released break contact 18B–7 to ground.

We shall assume at this point that conversation continues to ensue between the two parties in the conventional manner. From the foregoing description, it is obvious that the line appearance of station S2 in local office B no longer has a linkage connection associated therewith and thus is idle and available for purpose of a subsequent incoming connection. We shall further assume that a subsequent incoming connection is directed to station S2 via incoming trunk 2 at this time. This connection is completed through to the FT, FR and FS conductors associated with the line appearance of station S2 on line link frame 402 in a manner identical to that set forth hereinbefore for the initial calling connection. As also set forth herein, ringing potential is applied to the FT and FR leads associated with the called line appearance in the well-known fashion. The aforedescribed operation of transfer contacts 18D–2 and 18D–3 in auxiliary line circuit 21 prevents the extension of the ringing potential to the called station. However, as hereinbefore set forth, the ringing potential is extended via the FTR and FRR leads to ringing detection circuit 1801. Accordingly, relay 18RD reoperates in a manner identical to that set forth hereinbefore. The enabling of make contact 18RD–6 extends ground through make contact 18E–7 and released break contact 18B–7 to the ST conductor associated with call-waiting tone source 1802. Call-waiting tone source 1802 may comprise any number of configurations well known in the art such that, upon the application of a ground potential to an associated start lead a momentary tone is impressed upon an associated communication path. Accordingly, upon the enabling of the ST lead associated with call-waiting tone source 1802, a call-waiting signal is extended via the OA and OB leads associated with call-waiting tone source 1802 and through enabled make contacts 18E–8 and 18E–9 to the T and R leads associated with line circuit 401 and thus to the subset at station S2.

The impression of the aforesaid tone signal alerts the privileged station to the fact that subsequent incoming connection has been directed to his line. In order to answer the aforesaid subsequent connection, the subscriber at station S2 momentarily flashes the switchhook thereby opening the aforedescribed operate path of relay 18E. Relay 18E thereupon releases restoring break contacts 18E–8 to normal and thus completing the obvious operate path of relay 18D restoring that relay to normal. The subsequent release of transfer contacts 18D–2 and 18D–3 result in the reassociation of the T and R conductors from line circuit 401 through to the EI and FR conductors associated with the line link appearance on line link frame 402. The release of break contact 18D–9 places resistor 1807 in continuity with the FT and FR conductors associated with the calling connection forward through supervisory office 5 thereby maintaining that connection in a hold condition at this time.

For purposes of the description, we shall assume that the subscriber at station S2 converses briefly with the subsequent calling party, requests that party to excuse him briefly while he returns to the initial call and further advises that party and he shall resume the connection upon disposing of that call. The subscriber at station S2 thereupon flashes the switchhook once again thereby causing the release of relay 18B. The release of relay 18B completes the earlier described operate path of relay 18D. Accordingly, transfer contacts 18D–2 and 18D–3 are reenabled to associate the privileged station with the initial calling party. Enabled make contact 18D–10 places resistance 1808 in continuity with the FT and FR leads thus maintaining in a hold condition a forward connection to the subsequent calling party.

From the foregoing, it is obvious that the privileged station may be switchhook flash alternate connections between the initial and subsequent calling party as often as circumstances may dictate. It is also obvious that, upon the release of the subsequent calling connection through local switching office B, subsequent incoming connections may be completed through to station S2 in a manner identical to that set forth hereinbefore. Upon completion of the calling connection, the subset at station S2 is placed in an on-hook condition thereby causing the release of either relay 18B or relay 18E as the case may be. The linkage connection is thus restored to normal, ground is removed from the FS conductor to link and link control circuit 22 thereby releasing relay 19TP thus restoring to normal the linkage connection which extended to terminating call trunk 21. Relays 19ON and 19OH will, upon release return all circuitry in terminating call trunk 41 to an off normal condition. Auxiliary line circuit 21 and the associated equipment in common supervisory office 5 is thus available to serve future calling connections in a manner identical to that hereinbefore set forth.

2.08 Conclusion

It is to be noted with respect to the detailed description of the implementation of the various special service features herein set forth, that it would be obvious to one skilled in the art to combine the respective circuit apparatus of the various auxiliary line circuits or their equivalent into one or more such circuits so as to permit the provision of a plurality of special services to a given station. Such an arrangement would not constitute a departure from the spirit and scope of my invention since the various auxiliary line circuits disclosed herein have each been disclosed with respect to apparatus for providing a single special service feature only for purposes of simplifying the disclosure and the understanding thereof.

In addition, although the embodiment of my invention discloses a supervisory switching system associated with a plurality of conventional switching system in an arrangement wherein the supervisory switching system is operable to effect the establishment of various connections through conventional switching systems based upon control information provided by still another switching system, it is obvious that numerous other arrangements may be devised by those skilled in the art without departing from the spirit and scope of my invention.

For example, a convenient method for the call tracing of nuisance calls is inherent in my disclosure since a separate forward holding connection is established for all terminating calls. Thus, a suitable alerting signal from an associated auxiliary line circuit could be arranged to indicate that call tracing is required.

Another example would be the application of the principles of my invention to the provision of PICTUREPHONE service since PICTUREPHONE service may readily be provided by extending the required PICTUREPHONE transmission channel under control of the supervisory switching system.

I claim:

1. In a communication system, a plurality of switching centers each comprising:
- a plurality of stations and means for completing calling connections to and from said stations;
- another switching center comprising means for providing call processing information for each said station;
- and a supervisory switching center comprising:
  - means for monitoring all said calling connections;
  - means controlled by said monitoring means for interrogating said other switching center; and
  - means responsive to call processing information provided by said other switching center for modifying said calling connections.

2. In a communication system, the combination set forth in claim 1 wherein said other switching center is a stored program-controlled switching center.

3. In a communication system, the combination set forth in claim 1 wherein said modifying means includes means for extending certain of said calling connections from one of said stations through said other switching center.

4. In a communication system, the combination set forth in claim 1 wherein said supervisory switching center further comprises means for providing a supplementary calling connection to one of said stations.

5. In a communication system, the combination set forth in claim 4 wherein said supervisory switching center further comprises means responsive to the enabling of said supplementary calling connection providing means for releasing a priorly established calling connection to said one station.

6. In a communication system, the combination set forth in claim 1 wherein said monitoring means comprises a plurality of auxiliary line means each uniquely associated with one of said plurality of stations and operable to indicate the activated status of said station.

7. In a communication system, the combination set forth in claim 6 wherein:
- each said auxiliary line means is assigned a unique arbitrary designation; and
- means controlled by said monitoring means for manifesting the said arbitrary designation of any of said auxiliary line means.

8. In a communication system, the combination set forth in claim 1 wherein said interrogating means comprises a plurality of trunk circuits interconnecting said supervisory switching center and said other switching center.

9. In a communication system, the combination set forth in claim 8 further comprising:
- a plurality of auxiliary line circuits in said supervisory center each exclusively associated with one of said stations;
- a switching network for interconnecting any of said line circuits with any of said trunk circuits; and
- wherein said interrogating means further comprises means controlled by said auxiliary line circuits for enabling said network.

10. In a communication system, the combination set forth in claim 8 wherein said other switching center comprises means responsive to the enabling of any of said trunk circuits for enabling said call-processing information providing means.

11. In a telephone system, a plurality of switching centers each comprising:
- a plurality of telephone stations;
- means responsive to control signals for completing calling connections to and from said stations; and a stored program controlled switching center comprising means for providing call-processing information for each said station, and a supervisory switching center comprising:
  - means for monitoring all said control signals;
  - means operative in response to said control signals for interrogating said stored program control-switching center; and
  - means responsive to call-processing information provided by said stored program controlled switching center for varying the operation of each of said calling connection completing means.

12. In a telephone system, a plurality of switching centers each comprising:
- a plurality of telephone stations;
- means for completing calling connections to and from said stations;
- another switching center comprising means for providing special service call-processing information individually associated with each of said stations;
- means operative in response to control signals associated with each of said connections at said connections at said plurality of switching centers for enabling said other switching center; and
- means responsive to call-processing information provided by said other switching center for modifying certain of said calling connections.

13. In a telephone system, a switching center comprising:
- telephone stations each assigned a special service and means for completing connections to and from said stations;
- another switching center comprising means for providing call-processing information individually associated with each of said stations; and
  - a supervisory switching center comprising:
  - means operative in response to each enabling of said connection completing means for enabling said other switching center; and
  - means controlled by said other switching center call-processing information providing means for directing the implementation of the special service assigned to any said station.

14. In a telephone system:

a plurality of switching centers each comprising a plurality of telephone stations and means responsive to calling signals from any said station for completing a calling connection from said station;

another switching center comprising means for detecting and registering all said calling signals, and a supervisory switching center comprising means responsive to the initiation of a calling connection from any said station for enabling said other switching center;

means at said other center responsive to registration of a predetermined number of calling signals from one of said stations for translating said registered calling signals into a predetermined series of calling signals; and means for transmitting said translated series of calling signals to the said calling completion means at the said switching center associated with said one station.

15. In a telephone system:

the combination set forth in claim 14 wherein said supervisory switching center further comprises means for reinitiating said calling connection from said station; and wherein said other switching center further comprises means controlled by said translating means for enabling said reinitiating means.

16. In a telephone system the combination set forth in claim 14 wherein said other switching center is a stored program control switching center.

17. In a telephone system, the combination set forth in claim 14 wherein said supervisory switching center enabling means comprises a plurality of auxiliary line means each uniquely associated with one of said plurality of stations and operable to indicate the activated status of said station.

18. In a telephone system:

the combination set forth in claim 17 wherein each said auxiliary line means is assigned a unique arbitrary designation; and means controlled by said supervisory switching center enabling means for manifesting the said arbitrary designation of any of said auxiliary line means.

19. In a telephone system, the combination set forth in claim 14 wherein said supervisory switching center enabling means comprises a plurality of trunk circuits interconnecting said supervisory switching center and said other switching center.

20. In a telephone system:

the combination set forth in claim 19 further comprising a plurality of auxiliary line circuits in said supervisory center each exclusively associated with one of said stations; and a switching network for interconnecting any of said line circuits with any of said trunk circuits and wherein said supervisory switching center enabling means comprises means controlled by said auxiliary line circuits for enabling said network.

21. In a telephone system, the combination set forth in claim 19 wherein said other switching center comprises means responsive to the enabling of certain of said trunk circuits for enabling said translating means.

22. In a telephone system, the combination set forth in claim 18 wherein said supervisory switching center further comprises means for transmitting to said other switching center the said arbitrary designation of any of said auxiliary line means.

23. In a telephone system:

the combination set forth in claim 22 wherein said translating means further comprises means for translating the said arbitrary designation of said auxiliary line means into the identify of said one station;

means for storing a plurality of said predetermined series of calling signals; and means controlled by said identity for reading from said storing means said translated series of calling signals.

24. A centralized abbreviated dialing telephone-switching system comprising:

a plurality of telephone-switching centers each comprising:

a plurality of stations and common control means within each said center responsive to the reception of directory numbers for completing calling connections from said stations;

another switching center;

a supervisory switching center associated with all said stations comprising:

means for recognizing the initiation of a call from any of said one stations;

means for conveying to said other center the generation of an abbreviated code by said one station; and means at said other center for registering said code;

means for translating said code into a corresponding directory number; and means for transmitting said directory number to the call completion means associated with any said one station.

25. In a communication system:

a plurality of switching centers each comprising:

a plurality of stations;

means controlled by said stations for generating control signals; and means responsive to said control signals for completing communication paths to and from said stations;

another switching center;

a supervisory switching center comprising:

means for detecting a first control signal generated to a said communication path;

means responsive to the enabling of said detecting means for extending a connection from said station through said supervisory center to said other center; and means at said other center controlled by additional said signals from said station for further extending said connection to a called station.

26. In a communication system, the combination set forth in claim 25 wherein each said station comprises a telephone subset and said first control signal comprises a switchhook flash of the subset at said one station.

27. In a communication system, the combination set forth in claim 25 wherein said other switching center is a stored program-controlled switching center.

28. In a communication system, the combination set forth in claim 25 wherein said detecting means comprises a plurality of auxiliary line means each uniquely associated with one of said plurality of stations.

29. In a communication system:

the combination set forth in claim 28 wherein each said auxiliary line means is assigned a unique arbitrary designation; and means controlled by said connection extending means at said supervisory switching center for manifesting the said arbitrary designation of the auxiliary line means associated with said one station.

30. In a communication system, the combination set forth in claim 25 wherein said connection extending means comprises a plurality of trunk circuits interconnecting said supervisory switching center and said other switching center.

31. In a communication system:

the combination set forth in claim 30 further comprising:

a plurality of auxiliary line circuits in said supervisory center each exclusively associated with one of said stations;

a switching network for interconnecting any of said line circuits with any of said trunk circuits; and wherein said connection extending means further comprises means controlled by said auxiliary line circuits for enabling said network.

32. In a communication system, the combination set forth in claim 30 wherein said other switching center comprises means responsive to the enabling of any of said trunk circuits for rendering operable the said further extending connecting means.

33. In a communication system, the combination set forth in claim 25 further comprising:

an auxiliary line circuit in said supervisory switching center which is exclusively associated with said one station; and wherein said auxiliary line circuit comprises means responsive to said first control signal for placing said currently connected communications path in a hold condition.

34. In a communication system, the combination set forth in claim 33 wherein said auxiliary line circuit further comprises: means responsive to the subsequent generation of another first control signal for releasing said hold condition placing means and means for interconnecting said currently connected communications path and said connection to said called station.

35. In a communication system, the combination set forth in claim 34 wherein said auxiliary line circuit further comprises means responsive to a first control signal generated after the enabling of said interconnecting means for releasing said interconnecting means.

36. In a communication system:

a plurality of switching centers each comprising:

a plurality of lines; and means for completing calling connections to said lines;

another switching center;

a supervisory switching center comprising:

means for detecting the completion of a calling connection to any one of said lines and means responsive to the enabling of said detecting means for extending said connection from said line through said supervisory center to said other center; and means at said other center enabled in response to the extension of said connection for further extending said connection to a predetermined other line.

37. In a communication system, the combination set forth in claim 36 further comprising:

a telephone subset connected to said one line; and means responsive to the enabled condition of said subset for releasing said supervisory switching center extending means.

38. In a communication system, the combination set forth in claim 36 wherein said switching center calling completion means each comprise means for applying ringing potential to a called said line and wherein said supervisory switching center-detecting means comprises means for detecting said ringing potential.

39. In a communication system, the combination set forth in claim 38 further comprising means at said supervisory center responsive to signal means enabled by said further extending means for disabling said ringing potential application means.

40. In a communication system, the combination set forth in claim 36 wherein said predetermined other line is controlled by the identity of said one line.

41. In a communication system, the combination set forth in claim 36 wherein said other switching center is a stored program controlled switching center.

42. In a communication system, the combination set forth in claim 36 wherein said detecting means comprises a plurality of auxiliary line means each uniquely associated with one of said plurality of lines.

43. In a communication system, the combination set forth in claim 42 wherein each said auxiliary line means is assigned a unique arbitrary designation and means controlled by said supervisory switching center for manifesting the said arbitrary designation of any of said auxiliary line means.

44. In a communication system, the combination set forth in claim 36 wherein said supervisory center connection extending means comprises a plurality of trunk circuits interconnecting said supervisory switching center and said other switching center.

45. In a communication system, the combination set forth in claim 44 wherein said supervisory center detecting means comprising a plurality of auxiliary line circuits each associated with one of said lines; and a switching network for interconnecting any of said line circuits with any of said trunk circuits and wherein said connection extending means comprises means controlled by said auxiliary line circuits for enabling said network.

46. In a communication system, the combination set forth in claim 44 wherein said other switching center comprises means responsive to the enabling of certain of said trunk circuits for enabling said further extension connecting means.

47. In a communication system, the combination set forth in claim 36 wherein said further extending connecting means comprises a memory in which is stored the identity of a plurality of said predetermined other lines and which said memory is addressed by the identity of the line from which the said calling connection has been extended to said other switching center.

48. In a communication system:

a plurality of switching centers each comprising:

a plurality of stations; and means for completing a first calling connection to any of said stations;

another switching center; and a supervisory switching center comprising:

means for detecting the completion of a first calling connection to any one of said stations;

means responsive to the enabling of said detecting means for extending said connection from said station through said supervisory center to said other center;

means responsive to an answer condition of said one station for releasing said extending means;

means for completing a second calling connection to said one station through said supervisory center; and means responsive to the said establishment of said second connection for releasing said first connection.

49. In a communication system, a combination set forth in claim 48 further comprising means operable upon the release of said first calling connection for completing another calling connection to said one station.

50. In a communication system:

the combination set forth in claim 49 wherein said supervisory center further comprises means responsive to the completion of said other connection for reenabling said detecting means; and means controlled by said detecting means for impressing an alerting tone upon said second calling connection.

51. In a communication system, a combination set forth in claim 49 further comprising means responsive to each repetition of a discrete signal from said one station for alternatively connecting said one station exclusively to said second and said other connections.

52. In a communication system, the combination set forth in claim 51 wherein said discrete signal comprises a switchhook flash of a telephone subset at said one station.

53. In a communication system:

the combination set forth in claim 48 further comprising a plurality of calling trunk circuits; and each said calling connection comprising a linkage path between one of said trunk circuits and said one station, and wherein said second connection completing means comprises means for identifying the trunk associated with said first calling connection.

54. In a communication system, the combination set forth in claim 48 wherein said other switching center is a stored program controlled switching center.

55. In a communication system, the combination set forth in claim 48 wherein said detecting means comprises a plurality of auxiliary line means each uniquely associated with one of said plurality of stations.

56. In a communication system, the combination set forth in claim 48 wherein said supervisory center connection extending means comprises a plurality of trunk circuits interconnecting said supervisory center and said other center.

57. In a communication system:

the combination set forth in claim 48 wherein said supervisory center detecting means comprises a plurality of auxiliary line circuits each exclusively associated with one of said stations, and a switching network for interconnecting any of said line circuits with any of said trunk circuits and wherein said second calling connection-completing means comprises means controlled by said auxiliary line circuits for enabling said network.